United States Patent [19]
Seto et al.

[11] Patent Number: 6,021,102
[45] Date of Patent: Feb. 1, 2000

[54] DISC DRIVE APPARATUS FOR MORE THAN ONE TYPE OF DISC

[75] Inventors: Hidekazu Seto; Kenji Nagashima, both of Kanagawa, Japan

[73] Assignee: Sony Corporation, Tokyo, Japan

[21] Appl. No.: 08/915,877

[22] Filed: Aug. 21, 1997

[30] Foreign Application Priority Data

Aug. 21, 1996 [JP] Japan ................................. 8-237365

[51] Int. Cl.⁷ ..................................................... G11B 3/90
[52] U.S. Cl. ......................................... 369/58; 369/44.27
[58] Field of Search ................................... 369/109, 110, 369/112, 54, 58, 44.23, 44.27, 44.29, 44.35, 94

[56] References Cited

U.S. PATENT DOCUMENTS

| | | | |
|---|---|---|---|
| 5,235,581 | 8/1993 | Miyagawa et al. | 369/58 X |
| 5,289,451 | 2/1994 | Ashinuma et al. | 369/54 X |
| 5,724,325 | 3/1998 | Jeong | 369/58 X |
| 5,757,742 | 5/1998 | Akiba et al. | 369/44.23 |
| 5,774,438 | 6/1998 | Park et al. | 369/58 X |
| 5,831,953 | 11/1998 | Numata . | |

OTHER PUBLICATIONS

C. W. Lee et al., "A Compact–Disc–Compatible Digital Versatile Disc Pickup Using Annular Mask," JPN. J. Appl. Phys., vol. 36, Part 1, No. 1B, Jan. 1997, pp. 486–490.

Y. Tsuchiya et al., "Digital Video Disc/Compact Disc Compatible Pick–Up with Liquid Crystal Shutter," JPN. J. Appl. Phys., vol. 36, Part 1, No. 1B, Jan. 1997, pp. 481–485.

R. Katayama et al., "Dual Wavelength Optical Head for 0.6 MM and 1.2 MM Substrate Thicknesses," JPN. J. Appl. Phys., vol. 36, Part 1, No. 1B, Jan. 1997, pp. 460–466.

*Primary Examiner*—Paul W. Huber
*Attorney, Agent, or Firm*—Limbach & Limbach LLP

[57] ABSTRACT

The present invention provides a disc drive apparatus which identifies a type of a disc mounted on the apparatus by using reflected beam data obtained from a laser beam focused on the disc surface and other reflected beam data obtained from the laser beam being focused on the disc signal plane. For example, while forcibly changing the laser beam focusing point within a variable range at a predetermined velocity, a luminous energy signal or a focus error signal is used to count a time difference between a timing of focusing on the disc surface and a timing of focusing on the disc signal plane. According to the time difference obtained, the disc mounted is identified as a first type of disc or a second type of disc.

49 Claims, 14 Drawing Sheets

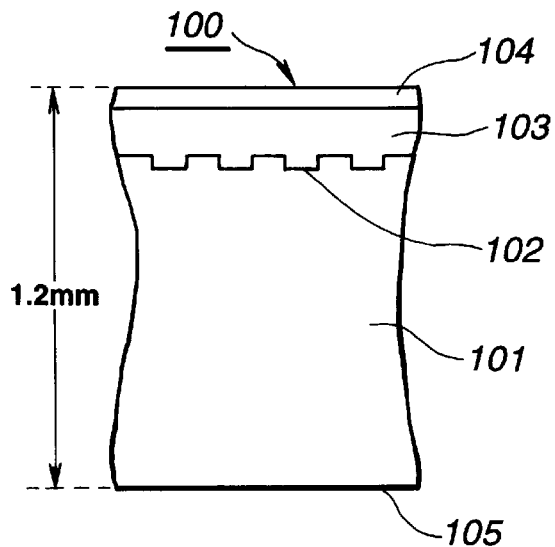
FIG.1(A) CD
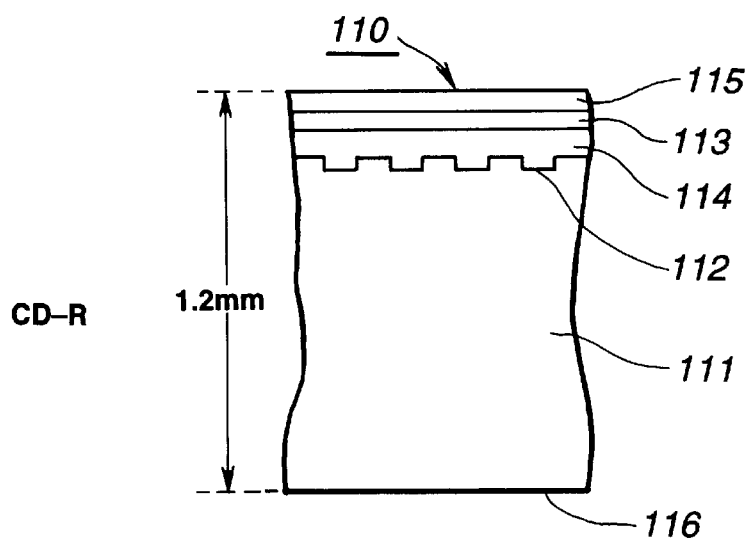
FIG.1(B) CD-R
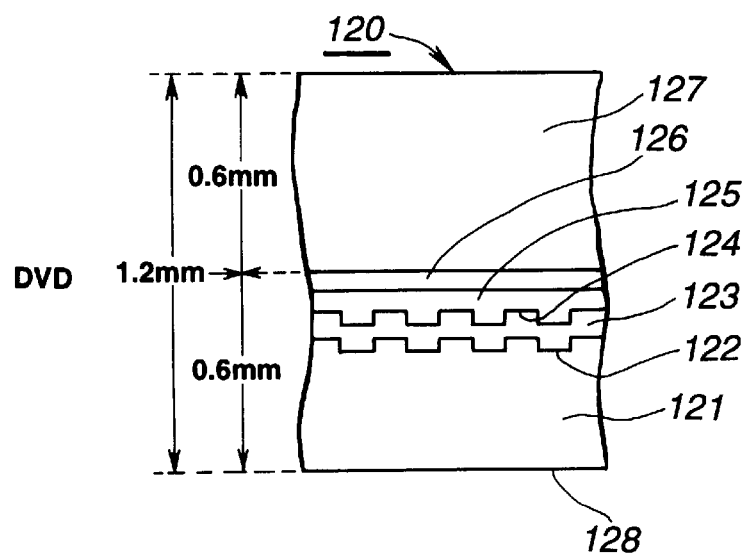
FIG.1(C) DVD r1 > r2 > r3 > r4 > r5 > r6

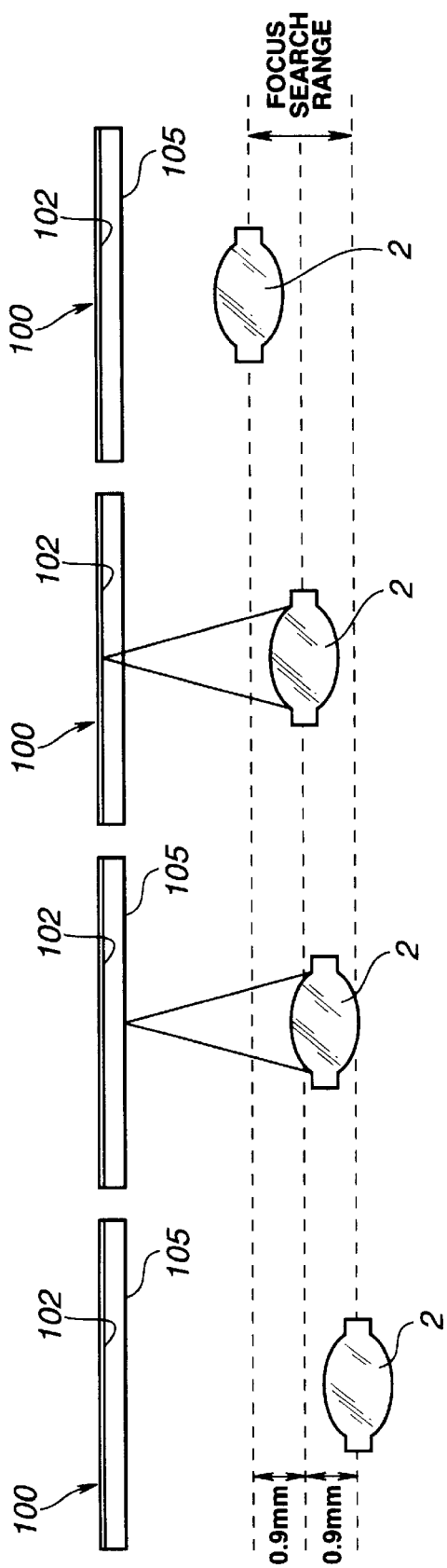

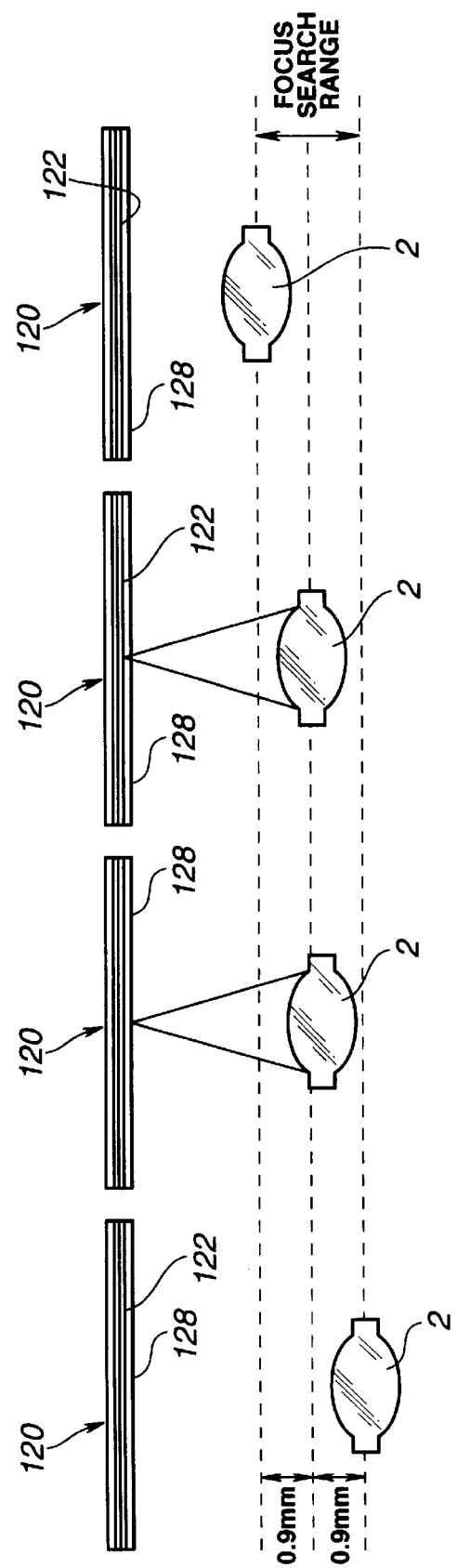

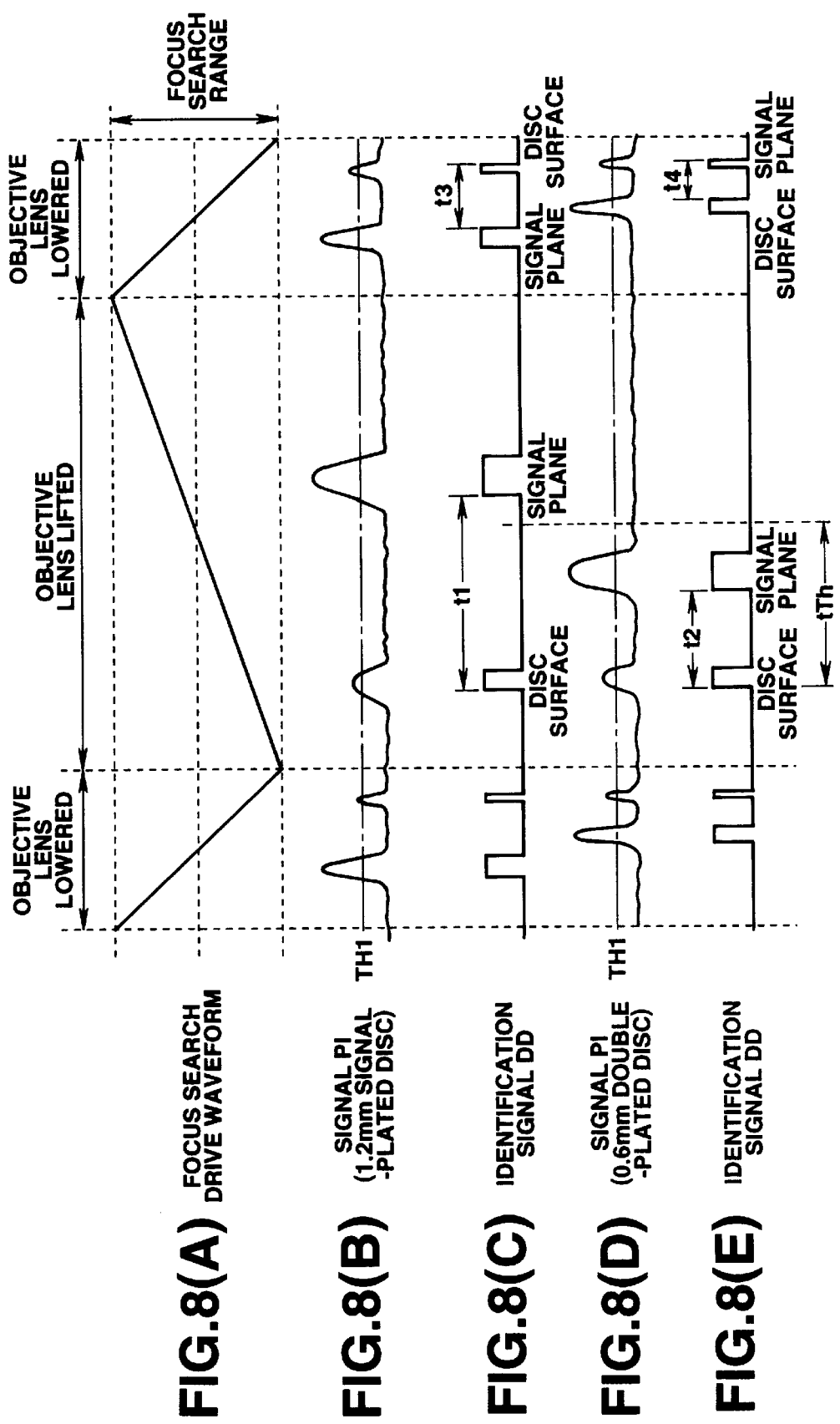

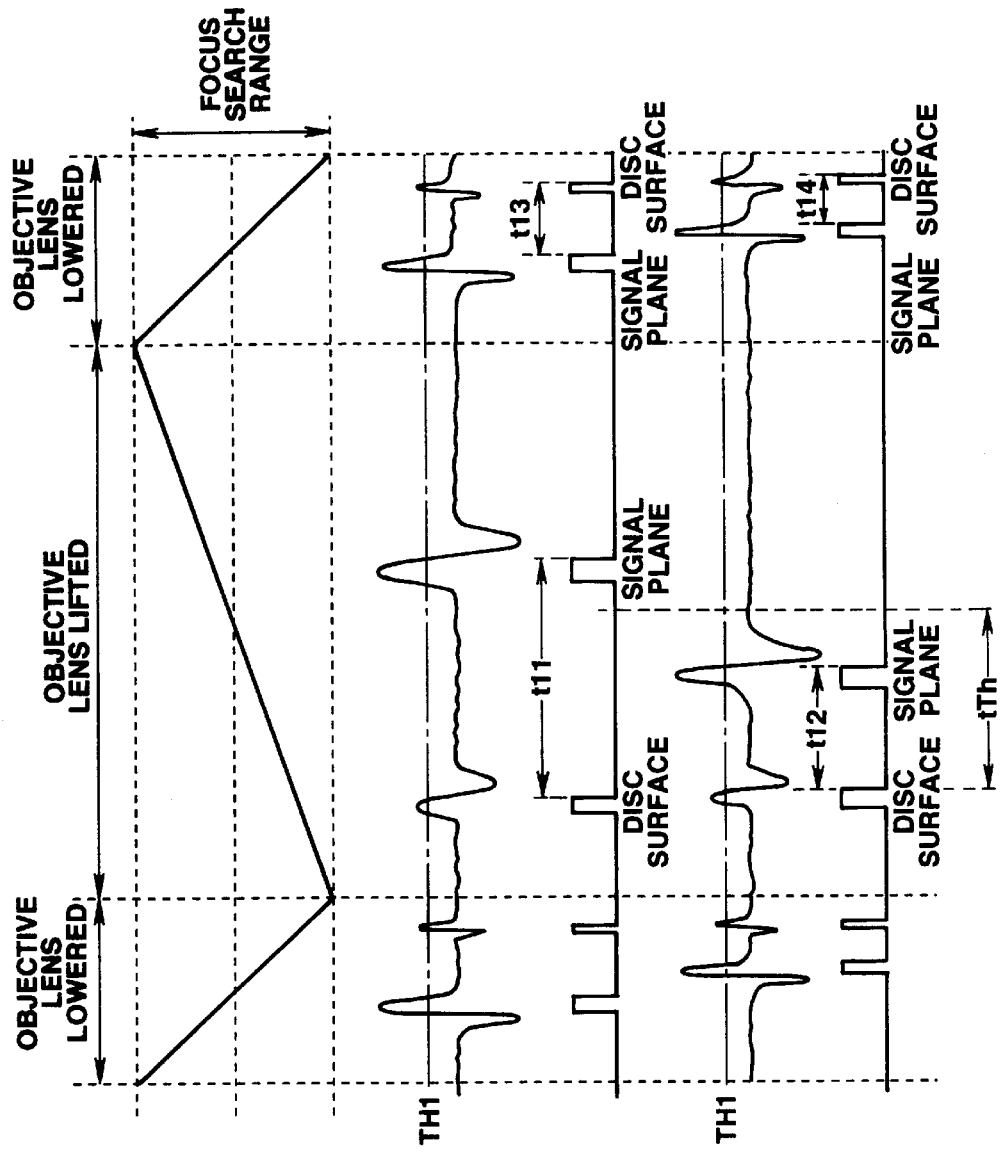

DISC DRIVE APPARATUS FOR MORE THAN ONE TYPE OF DISC

BACKGROUND OF THE INVENTION

1. Field of the Invention

The present invention relates to a disc drive apparatus capable of carrying out reproduction or recording in accordance with a plurality of disc type recording media.

2. Description of Related Art

As an optical disc recording medium, compact discs (CD) are widely used for music and other fields. A compact disc for music is normally used only as a reproduction medium. However, a compact disc recordable (CD-R) is also being developed. This is a disc into which additional data can be written.

A disc called DVD (digital versatile disc/digital video disc) is also being developed as an optical disc recording medium for multimedia use. The DVD is expected to be applied to a wide range of fields such as video data, audio data, and computer data. Although a DVD is the same as a CD in size (diameter of 12 cm), a recording capacity is remarkably increased by means of reduction in recording track pitch and data compression technique.

Corresponding to the development of a novel disc, it is desired to provide a disc drive apparatus having a compatibility with a conventional disc.

For example, it is desired to develop a disc drive apparatus which answers both to the CD and DVD. However, because of the difference in their layered structures, each of the CD and the DVD requires a specific pickup device (or a block of an optical section in a pickup device). When a disc is mounted, it should be identified as a CD or DVD, and a corresponding block should be set in for use.

When specific blocks are switched corresponding to a plurality of types of disc, it is necessary to accurately identify the type of a disc which is mounted on the apparatus.

For example, in a case when a disc is contained in a cartridge, the type of the disc can easily be identified by preparing an identification hole on the cartridge. However, this method cannot be applied to a disc which is not contained in a cartridge such as CD and DVD. Moreover, when discs have an identical size, no mechanical detection method can be applied.

Furthermore, it is not preferable to provide a particular component or mechanism for disc type detection such as a sensor because the apparatus configuration becomes complicated and costs are increased.

SUMMARY OF THE INVENTION

It is therefore an object of the present invention to provide a disc drive apparatus capable of recording or reproducing data onto/from a first type and a second type of disc, which can be identified correctly and easily without providing a particular mechanical detection mechanism.

For this, there is provided identification means for identifying a first or a second type of a disc which is mounted, by using a laser beam output from pickup means, i.e., data of a reflection from a laser focusing on a disc surface and data of a reflection from a laser focusing on a disc signal plane.

This identification means observes a luminous energy signal of a reflected beam or a focus error signal which is a signal corresponding to a focusing state of the laser beam. By forcibly varying a focus position of the laser beam output from the pickup means, within a variable range at a predetermined speed, a time difference between a timing of a beam focusing on the disc surface and a timing of a beam focusing on the signal plane is determined from a luminous energy signal and a focus error signal. A value of the time difference is used to identify the first type or the second type of disc.

This identification operation utilizes a difference in disc layers. That is, in a direction of a disc thickness, the signal plane is located at a different position from the disc surface. Thus, the difference between the timing of the disk surface and the timing of the signal plane is determined to identify a disc type, without using a particular component such as a sensor.

A disc drive apparatus according to the present invention is provided with pickup means including a first block corresponding to a first type of disc and a second block corresponding to a second type of disc so that the first block and the second block are switched to each other by control means according to a result of disc type identification by identification means.

The control means is constructed to use the first block or the second block of the pickup means as an initially selected block, and controls to use this initially selected block during an identification operation by the identification means, and when a disc is identified by the identification means, as a type corresponding to the initially selected block, the control means can carry out a focus servo lead-in from the timing of focusing on the disc plane for the identification operation.

For carrying out a disc identification operation, one of the first block and the second block is used. If an identified disc type corresponds to the initially selected block, operation such as servo lead-in can be initiated directly, thus increasing efficiency of the apparatus operation.

BRIEF DESCRIPTION OF THE DRAWINGS

FIGS. 1A–1C are schematic view showing configurations of discs applicable to a disc drive apparatus according to an embodiment of the present invention.

FIGS. 6A–6D illustrate the principle of disc identification operation in the embodiment of the present invention.

FIGS. 7A–7D illustrate the principle of a disc identification operation in the embodiment of the present invention.

FIGS. 8A–8E show the first, second, and fourth examples of the disc identification operation in the embodiment of the present invention (the third example is shown in FIGS. 16a–16e).

FIGS. 16a–16e shows the third example of disc identification operation in the embodiment of the present invention.

DETAILED DESCRIPTION OF THE PREFERRED EMBODIMENTS

Figure 2:
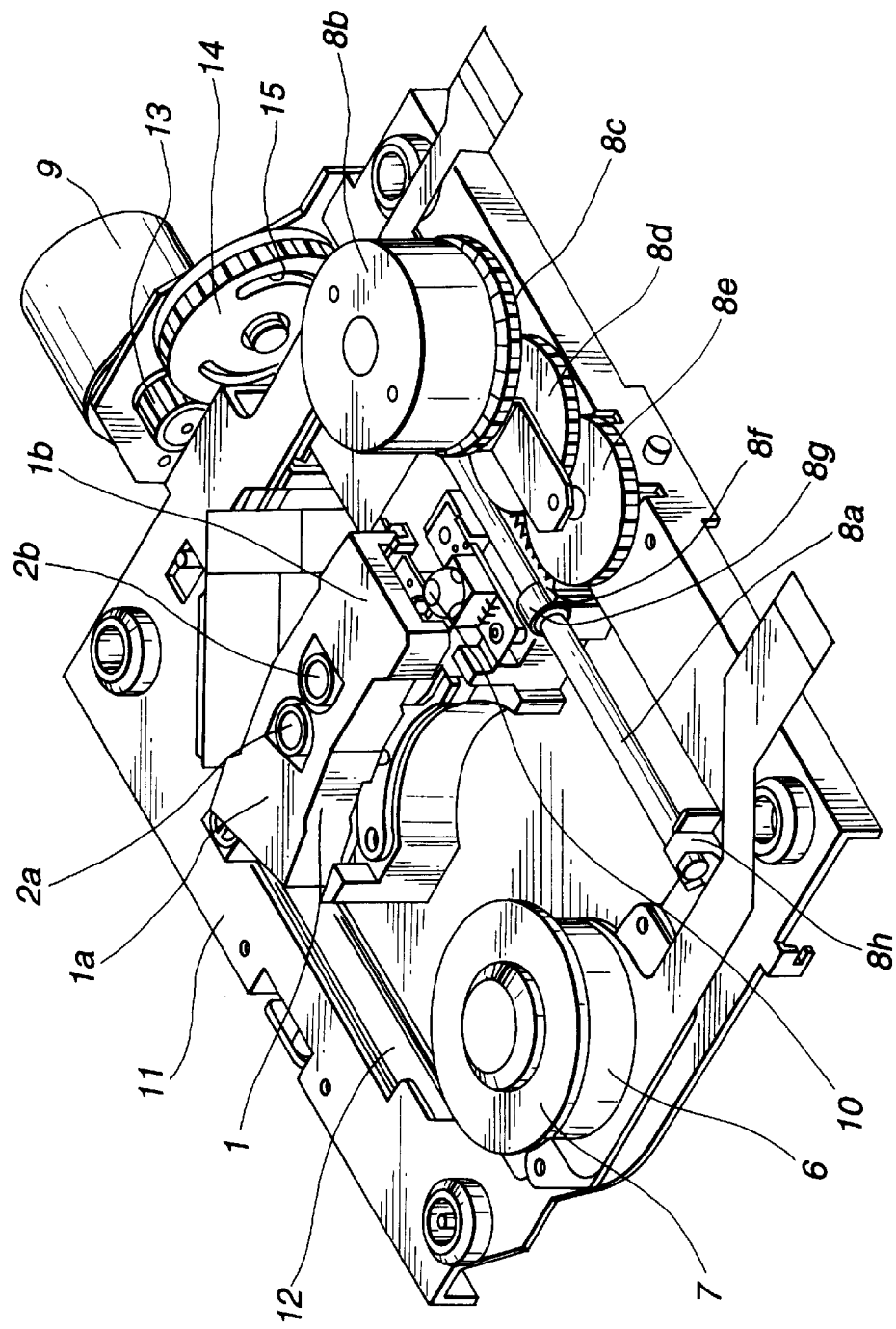
FIG. 2 is a perspective view of a mechanical deck of the disc drive apparatus according to the embodiment of the present invention.

Description will now be directed to a disc drive apparatus compatible with the CD and the DVD as an embodiment of the present invention. The following will be explained below in this order.

1. Various Disc Configurations
2. Disc Drive Apparatus Configuration according to an Embodiment of the Present Invention
3. First Example of Disc Identification Operation
4. Second Example of Disc Identification Operation and Comparison with First Identification Operation
5. Third Example of Disc Identification Operation
6. Fourth Example of Disc Identification Operation 1. Various Disc Configurations Before explaining a disc drive apparatus compatible with the CD and the DVD, configurations of the CD, DVD, and the CD-R will be explained with reference to FIG. 1. It is assumed that each of the CD, DVD, and CD-R is a disc having an identical diameter of 12 cm.

FIGS. 1(A), (B), and (C) are cross-sectional views of the CD, CD-R, and DVD, respectively. It is assumed that each of the CD, CD-R, and DVD has a total thickness of 1.2 mm.

FIG. 1(A) shows a compact disc (CD) 100 having a disc substrate (transparent layer) 101, a signal plane 102, a reflection layer 103, and a protection layer 104. The disc substrate (transparent layer) 101 is shaped from a transparent polycarbonate resin or other transparent synthetic resin material such as polyvinyl chloride resin and acrylic resin which has a high optical transparency and a high mechanical or chemical resistance. A set of pits is transferred on a main surface of the disc substrate 101 by a stamper built in a mold, so as to create a signal plane 102. Each of the pits on the signal plane is formed so as to have a different length in the circumferential direction, i.e., to be an encoded small hole, thus forming a recording track.

After this signal plane 102 is formed on the disc substrate 101, aluminium having a high optical reflection is deposited so as to form a reflection layer 103. Further, the reflection layer 103 is covered with a protection layer 104, thus completing the CD 100.

A laser beam from the disc drive apparatus comes into the disc from a disc surface 105 and a data recorded on the signal plane 102 is detected through a reflection of the laser beam.

FIG. 1(B) shows a cross section of a compact disc recordable (CD-R) 110 composed of a disc substrate 111, an organic pigment layer 114, a metal reflection layer 113, and a protection layer 115, each stacked on one another in this order. The CD-R is identical to the CD 100 in physical characteristics (diameter, weight, thickness) and capacity, but the CD-R can be economically produced in a small amount compared to the CD, and has a longer service life. That is, the CD-R is an ideal medium for data storage.

The CD-R 110 also has a disc substrate (polycarbonate) 111 viewed from the disc surface 116.

On this disc substrate 111 are successively stacked the organic pigment layer 114, the metal reflection layer 113, and the protection layer 115, thus forming the CD-R 110. This CD-R 110 has a groove as a laser beam radiation guide, which is covered with the organic pigment layer 114. The organic pigment layer 114 reacts with the polycarbonate of the disc substrate 111 with heat from a radiated laser beam to form a pit according to a data signal. Thus, a signal plane 112 is formed with actually recorded data.

The DVD of FIG. 1(C) also has a disc substrate 121 when viewed from a disc surface 128, and a signal plane is formed on this disc substrate 121. Two types of DVD have been proposed: a single-layered disc which has one signal plane and a double-layered disc which has two signal planes. FIG. 1(C) illustrates an example of the double-layered disc which has a first signal plane 122 and a second signal plane 124. That is, the first signal plane 122 and a first reflection layer 123 corresponding to this first signal plane form a data recording plane of a first layer, whereas the second signal plane 122 and a second reflection layer 125 corresponding to this second signal plane form a data recording plane of a second layer.

The second reflection layer 125 is covered with a contact plane 126 and the with a dummy plate 127.

The first reflection layer 123 is a semi-transparent film so that a predetermined ratio of a laser beam is reflected. When a laser beam is focused on the first signal plane 122, a signal recorded on the first signal plane 122 can be read from a reflected beam. When a laser beam is to be focused on the second signal plane 124, the laser beam goes through the first reflection layer 123 and is focused on the second signal plane 124. A signal recorded on the second signal plane 124 can be read from a beam reflected from the second reflection layer 125.

In the case of a single-layered disc, the signal plane and the reflection layer are formed in the same way as the second signal plane 124 and the second reflection layer 125.

Hereinafter, in the explanation of the embodiment in this Specification, no discrimination will be made between the single-layered disc and the double-layered disc, and the first signal plane 122, the second signal plane 124, and the signal plane in a single-layered disc all will be referred to simply as a signal plane and "signal plane 122" when referred to the drawings.

As shown in FIGS. 1(A), (B), and (C), in the CD 100 and in the CD-R 110, the signal planes 102 and 112 are formed almost at a position of the disc thickness viewed from the disc surface 105 and 116, respectively. (The signal planes 102 and 112 where a laser spot is to be focused are located at a position of approximately 1.2 mm from the disc surfaces 105 and 116, respectively.)

On the other hand, in the case of the DVD, the signal plane 122 (124) is located at a position almost at the center of the disc thickness. (The signal plane 122 (124) where a laser spot is to be focused is located at a position of approximately 0.6 mm from the disc surface.)

As has been described already, a recording density of pits formed on the signal plane 122 (124) is higher than the case of the CD 100 and the CD-R 110.

Because of these differences, a DVD reproduction apparatus requires a laser beam having a wave length of 650 nm or below for reproduction; an objective having a numerical aperture (NA) increased to 0.6; and a pickup optimized to focus a laser spot at a position of approximately 0.6 mm from the disc surface 128. That is, it is preferable to use a pickup different from a pickup used for an ordinary CD.

When considering CD/DVD compatibility while using such a pickup, it is not impossible theoretically to use a laser beam having a wave length of 650 nm or below to read data from the signal plane 102 of the CD 100. Moreover, it is not impossible to focus a laser spot at approximately 1.2 mm from the disc surface 105 of the CD 100.

However, it is the best way actually to use a pickup having optimal characteristics for the CD 100. This is more advantageous if reproduction characteristics are considered.

Furthermore, if the CD-R 110 is taken into consideration, the CD-R 110 has the organic pigment layer 114 dependent on a wave length. If a laser beam of 650 nm or below is used, no accurate data reproduction can be carried out.

That is, if a laser beam of 650 nm or below is radiated on the CD-R 110, the organic pigment layer 114 exhibits an increased absorption ratio and the reflection is decreased. Simultaneously with this, the modulation ratio of the laser beam by the pits on the signal plane 112 is lowered. Because a pit is formed for data recording with absorption ratio and reflectivity which are appropriate for a laser beam having a wave length of 780 nm, this data cannot be read out with sufficient modulation by using a laser beam having a different wave length.

In view of the aforementioned, it is preferable that the disc drive apparatus having compatibility between the CD 100 (CD-R 110) and the DVD 120 have at least separate objective lenses and laser source means dedicated to the specific discs.

2. Disc Drive Apparatus Configuration According to an Embodiment of the Present Invention FIGS. 2 through 5 explain an example of a configuration of a disc drive apparatus having compatibility with the CD 100 (and the CD-R 110) and the DVD 120 according to an embodiment of the present invention. This disc drive apparatus is provided with a pickup for the CD 100 and the CD-R 110 and a pickup for the DVD 120. For convenience, the CD 100, the CD-R 110, and the DVD 120 are generally referred to as discs D.

FIG. 2 is a perspective view of a reproduction drive portion (mechanical deck) of the disc drive apparatus.

The mechanical deck has a sub-chassis 11 on which various mechanisms required for disc reproduction drive are arranged. A disc is mounted on a turn table 7. When the turn table 7 is turned by a spindle motor 6, the disc is also turned together.

A laser beam is radiated onto the turning disc, and a reflected beam is used to extract a data by a pickup 1 which consists of two independent pickups in a cabinet of the pickup 1: a CD pickup 1a provided with an optimal optical system and a laser source for the CD 100 (CD-R 110) and a DVD pickup 1b provided with an optimal optical system and a laser source for the DVD 120. The CD pickup 1a has a laser output end which is an objective lens 2a for the CD, whereas the DVD pickup 1b has a laser output end which is an objective lens 2b for the DVD.

The pickup 1 is slidable in a disc radius direction by a so called sledding mechanism. For this, the pickup 1 is provided with a main shaft 8a and a sub-shaft 12 at its two sides. The main shaft 8a passes through a holder 8g of the pickup 1, and the sub-shaft 12 passes through another holder which is located on the opposite side but not depicted. Thus, the pickup 1 is supported by the main shaft 8a and the sub-shaft 12 and is movable in the direction of the shafts.

The pickup 1 is moved along the shafts by means of a sled motor 8b, sled transmission gears 8c, 8d, and 8e, and a rack gear 8f which is mounted in the vicinity of the holder 8g.

When the sled motor 8b is driven to rotate, the rotation force is transmitted through the sled transmission gears 8c, 8d, and 8e, which is engaged with the rack gear 8f. Thus, the rotational force moves the pickup 1 in the shaft direction. That is, positive and opposite rotations of the sled motor 8b move the pickup 1 toward the inside and outer circumference of the disc.

Moreover, the pickup 1 is movable for so called skew correction according to an inclination state of the mounted disc.

For this, one end of the main shaft 8a is held by the holder 8h to roughly sit on the sub-chassis, whereas the other end is accurately engaged in a cam groove formed on the skew gear 14.

Rotation of the skew gear 9 is transmitted through the transmission gear 13 to the skew gear 14.

Figure 3:
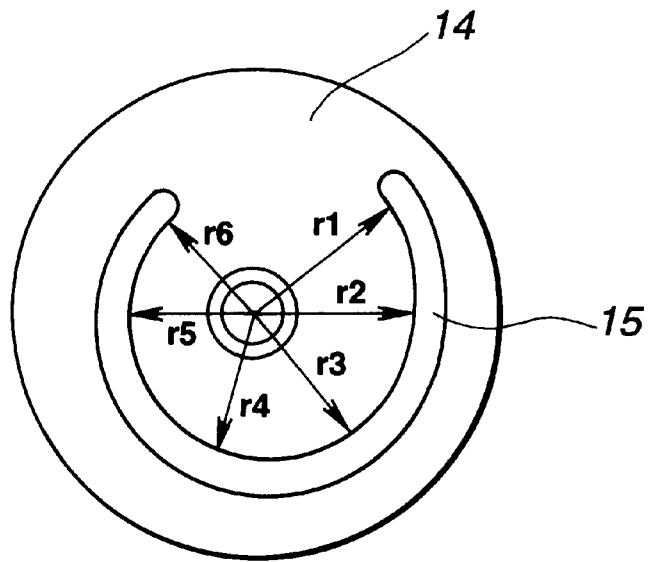
FIG. 3 illustrates a skew adjusting mechanism of the disc drive apparatus according to the embodiment of the present invention.

As shown in FIG. 3, the cam groove 15 in the skew gear 14 is formed as a U-shaped spiral curve. If a distance from a rotation center of the skew gear 14 to the cam groove 15 is assumed to be "r", the distance is reduced as follows: r1>R2>r3>r4>R5>r6.

Consequently, when the main shaft 8a is held with its one end engaged in this cam groove 15, the inclination of the main shaft 8a is set by the rotational position of the skew gear 14. That is, the inclination in the radial direction of the pickup 1 can be adjusted by driving the skew motor 9.

A relative inclination between the pickup 1 and the disc is detected by a skew sensor 10 mounted on the pickup 1. For example, the skew sensor detects a skew state by counting a time from a moment of reflection of an optical beam on the disc until the reflection is received. The skew motor 9 is driven according to the skew state detected by the skew sensor 10. Thus, a relative inclination between the pickup 1 and the disc mount can be corrected by adjusting inclination of the pickup 1.

Figure 4:
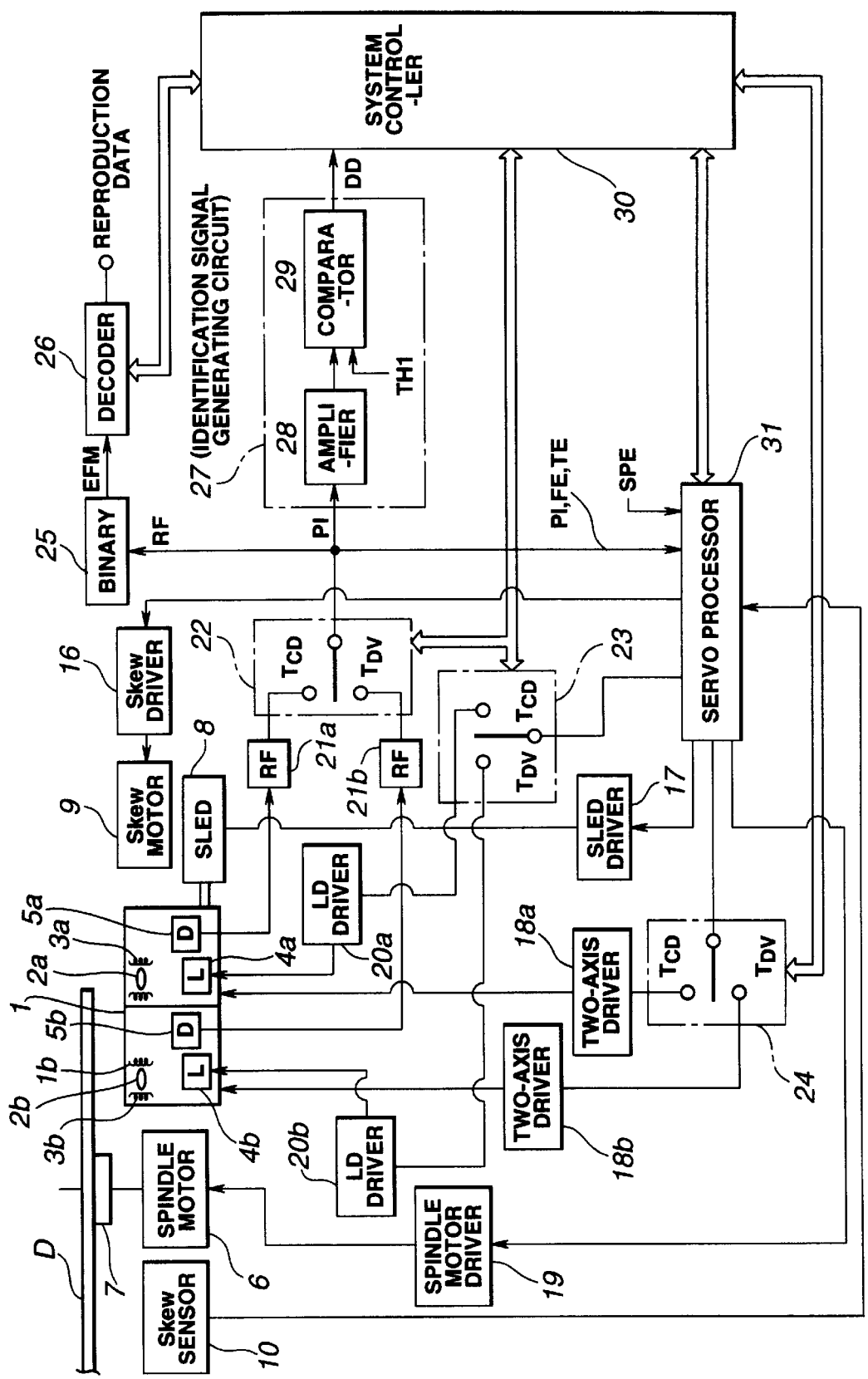
FIG. 4 is a block diagram of main components of the disc drive apparatus according to the embodiment of the present invention.

FIG. 4 is a block diagram of a main portion of the disc drive apparatus.

The disc D is mounted on the turn table 7 shown in FIG. 2 and, in a reproduction mode, driven to rotate by a spindle motor 6 at a constant linear velocity (CLV) or at a constant angular velocity (CAV).

Then, data recorded in pits on the disc D are read out by the pickup 1. As has been explained, the pickup 1 actually consists of two independent pickups (CD pickup 1a and DVD pickup 1b).

The CD pickup 1a is provided with an optimal optical system for the CD 100 and the CD-R 110. A laser diode 4a which functions as a laser source outputs a beam with a center wave length of 780 nm, for example; and the CD objective lens 2a has NA=0.6. The CD objective lens 2a is movably held by a two-axis mechanism 3a both in a tracking direction and in a focusing direction.

The DVD pickup 1b is provided with an optimal optical system for the DVD 120. A laser diode 4b which functions as a laser source outputs a beam with a center wave length of 650 nm or 635 nm, for example; and the DVD objective lens 2b has NA=0.6. The DVD objective lens 2b is movably held by a two-axis mechanism 3b both in a tracking direction and in a focusing direction.

If the mounted disc D is a CD 100, the CD pickup 1*a* is used for reproduction. A reflected beam data from the disc D is detected by a detector 5*a* and turned into an electric signal according to a luminous energy, which signal is then supplied to an RF amplifier 21*a*.

If the mounted disc D is a DVD 120, the DVD pickup 1*b* is used for reproduction. In the case of DVD pickup 1*b*, a reflected beam data from the disc D is detected by a detector 5*b* and turned into an electric signal according to a luminous energy, which signal is then supplied to an RF amplifier 21*b*.

Each of the RF amplifiers 21*a* and 21*b* is provided with a current to voltage converting circuit, an amplification circuit, and a matrix calculation circuit, and generates a necessary signal according to the signal from the detectors 5*a* and 5*b*, respectively. For example, an RF signal as a reproduced data, a focus error signal FE for servo control, a tracking error signal TE, a pull-in signal PI which is also called a sum signal, and others.

Figure 5:
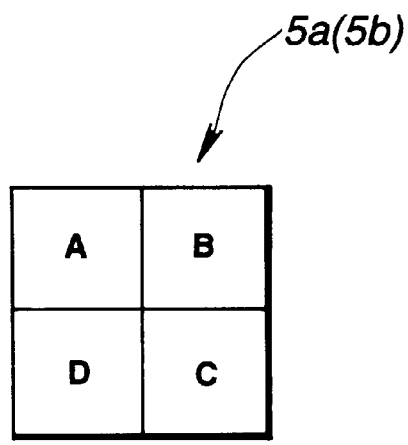
FIG. 5 is to be used for explanation of a four-division detector of the disc drive apparatus according to the embodiment of the present invention.

The detectors 5*a* and 5*b* are four-division detectors consisting of four detecting sections A, B, C, and D as shown in FIG. 5. In this case, the focus error signal FE is generated by using the outputs from the detecting sections A, B, C, and D through calculation of (A+B)−(B+D). The pull-in signal PI=(A+B+C+D).

The tracking error signal TE may be generate by using side spot detectors E and F arranged besides the four-division detector, and through calculation of E−F, if a so called 3-beam method is taken into consideration. Alternatively, it is also possible to generates a push-pull signal by using the four-division detector.

Various signals generated by the RF amplifier 21*a* are respectively supplied through a terminal $T_{CD}$ of a switch 22 to a binary circuit 25, servo processor 31, and an identification signal generating circuit 27. That is, if the disc D is a CD 100, then the switch 22 enters a $T_{CD}$-selected state; the reproduction signal RF from the RF amplifier 21*a* is supplied to the binary circuit 25; the focus error signal FE, the tracking error signal TE, and the pull-in signal PI are supplied to the servo processor 31; and the pull-in signal PI is further supplied to the identification signal generating circuit 27.

Various signals generated by the RF amplifier 21*b* are respectively supplied through a terminal $T_{DV}$ of the switch 22 to the binary circuit 25, the servo processor 31, and the identification signal generating circuit 27. That is, if the disc D is a DVD 120, then the switch 22 enters a $T_{DV}$-selected state; the reproduction signal RF from the RF amplifier 21*b* is supplied to the binary circuit 25; the focus error signal FE, the tracking error signal TE, and the pull-in signal PI are supplied to the servo processor 31; and the pull-in signal PI is further supplied to the identification signal generating circuit 27.

The reproduction RF signal obtained in the RF amplifier 21*a* or 21*b* is converted into a binary signal in the binary circuit 25, and as a EFM signal (8–14 modulating signal in the case of CD) or EFM+ signal (8–16 modulating signal in the case of DVD) is supplied to a decoder 26. The Decoder 26 carries out EFM demodulation, CIRC decoding, and, if necessary, CD-ROM decoding and MPEG decoding for reproducing data read from the disc D.

The servo processor 31 is supplied with the focus error signal FE and tracking error signal TE from the RF amplifier 21*a* or 21*b* as well as the spindle error signal SPE or the like from the decoder 26 or a system controller 30, to generate various servo drive signals of focusing, tracking, sledding, and spindle for carrying out a servo operation.

That is, according to the focus error signal FE and the tracking error signal TE, a focus drive signal and a tracking drive signal are generated and output to the switch 24. The switch 24 selects the $T_{CD}$ terminal if the disc D is a CD 100, and the $T_{DV}$ terminal if the disc D is a DVD 120.

During reproduction of the CD 100, the focus drive signal and the tracking drive signals which are generated corresponding to the focus error signal FE and the tracking error signal TE from the RF amplifier 21*a* are supplied to the two-axis driver 18*a*, which in turn drives a two-axis mechanism 3*a* in the CD pickup 1*a*. Thus, a tracking servo loop and a focus servo loop are formed by the CD pickup 1*a*, the RF amplifier 21*a*, the servo processor 31, and the two-axis driver 18*a*.

During reproduction of the DVD 120, the focus drive signal and the tracking drive signals which are generated in the servo processor 31 corresponding to the focus error signal FE and the tracking error signal TE from the RF amplifier 21*b* are supplied to the two-axis driver 18*b*, which in turn drives a two-axis mechanism 3*b* in the DVD pickup 1*b*. Thus, a tracking servo loop and a focus servo loop are formed by the DVD pickup 1*b*, the RF amplifier 21*b*, the servo processor 31, and the two-axis driver 18*b*.

The servo processor 31 supplies a spindle motor driver 19 with the spindle drive signal generated according to the spindle error signal SPE. The spindle motor driver 19, according to the spindle drive signal, applies, for example, a three-phase drive signal to the spindle motor 6 to carry out CLV rotation of the spindle motor 6. Moreover, the servo processor 31 generates a spindle drive signal according to a spindle kick/brake control signal from the system controller 30 so that the spindle motor driver 19 starts or stops the spindle motor 6.

The servo processor 31 also generates a sled drive signal according to a sled error signal obtained, for example, from the tracking error signal TE or an access control from the system controller 30, and supplies the sled drive signal to the sled driver 17. The sled mechanism 8 includes, as shown in FIG. 2, the main shaft 8*a*, the sled motor 8*c*, the sled transmission gears 8*c*, 8*d*, 8*e*, or the like. That is, the sled driver 17 drives the sled motor 8*b* according to a sled drive signal to properly slide the pickup 1.

The laser diode 4*a* in the CD pickup 1*a* is driven by a laser driver 20*a* to emit a laser beam. The laser diode 4*b* in the DVD pickup 1*b* is driven by a laser driver 20*b* to emit a laser beam.

The servo processor 31 generates a laser drive signal according to a signal from the system controller 30 and supplies the laser drive signal to the switch 23 so that the pickup 1 emits a laser beam during a reproduction or the like. The switch 23 selects the $T_{CD}$ terminal if the disc D is a CD 100 and the $T_{DV}$ terminal if the disc D is a DVD 120. Consequently, one of the laser diodes 4*a* and 4*b* carries out laser emission according to the disc to be reproduced.

Furthermore, the servo processor 31 is also supplied with detection data from the skew sensor 10. According to the detection data from the skew sensor 10, the servo processor 31 supplies a skew drive signal to the skew driver 16 to drive the skew motor 9. Thus, the skew servo operation explained with reference to FIG. 2 is carried out.

The above-described various operations of servo and decoding are controlled by the system controller 30 made of a microcomputer.

For example, various operations such as reproduction start, end, track access, fast feed reproduction, and fast feed back reproduction are realized by the system controller 30 which controls operations of the servo processor 31, the pickup 1 and others.

Because the apparatus is compatible both with the CD 100 and DVD 120, when a disc D is mounted, it is necessary to identify the disc D as a CD 100 or DVD 120. As has been explained, the pickup 1 (1a and 1b), the RF amplifiers 21a and 21b, the laser drivers 20a and 20b, and the two-axis drivers 18a and 18b are provided specifically for the CD 100 and DVD 120, respectively. In order to use these dedicated circuits properly, the system controller 30 should control the switches 22, 23, and 24 each to the $T_{CD}$ terminal or the $T_{DV}$ terminal according to the result of the disc identification.

The identification of the disc D is carried out, in this embodiment, by the identification signal generating circuit 27. According to an identification signal DD from the identification signal generating circuit 27, the system controller 30 detects the CD 100 or DVD 120.

The identification signal generating circuit 27 includes an amplifier circuit 28 and a comparator circuit 29. The amplifier circuit 28 amplifies the pull-in signal PI, whereas the comparator circuit 29 compares the amplified pull-in signal to a predetermined threshold value TH1 and makes the result of comparison an identification signal DD.

The disc identification operation carried out by this identification signal generating circuit 27 and the system controller 30 will be detailed below as the first, second, third, and fourth examples of disc identification operation.

3. First Example of Disc Identification Operation

As has been explained, each of the CD 100 and CD-R 110 has a signal plane 102, 112 at a position of approximately 1.2 mm from the disc surface 105, 116. On the other hand the DVD 120 has the signal plane 122 at a position of approximately 0.6 mm from the disc surface.

For explanatory convenience, the CD 100 and the CD-R 110 may be referred to as 1.2 mm single-plate discs, whereas the DVD 120 may be referred to as a 0.6 mm double-plate disc.

As shown in FIG. 6(C), the objective lens 2a of the CD pickup 1a is moved by the focus servo operation toward or from the CD 100 which is a 1.2 mm single-plate disc so that the laser beam is focused on the signal plane 102.

As is known, in order to carry out a focus servo control, the objective lens 2a is forcibly moved within a focus stroke range to detect a focus lead-in range. That is, an S-shaped curve is observed as a focus error signal, and a focus search operation is carried out to search for the focus lead-in range which is a linear range of the S-shaped curve. The focus servo loop is turned on when the objective lens 2a is positioned in the focus lead-in range, and after this, focus servo control is carried out for focusing to a just focus state.

The focus search and focus servo operation are identical in the DVD pickup 1b corresponding to the DVD 120.

However, as shown in FIG. 7(C), in the case of the DVD 120 which is a 0.6 mm double-plate disc, the laser beam is focused on the signal plane 122 which is at a different position from that of the CD 100 in the direction of the disc thickness.

The focus search ranges (focus stroke ranges) of the CD objective lens 2a and the DVD objective lens 2b are from a bottom position in FIG. 6(A) and FIG. 7(A) to a top position in FIG. 6(D) and FIG. 7(D), respectively. If the just focus position in FIG. 6(C) and FIG. 7(C) is assumed to be an initial reference position, the focus stroke range is approximately ±0.9 mm.

If the objective lens 2 (objective lens 2a for the CD and the objective lens 2b for the DVD) can be displaced to the positions as shown in (A), (B), (C), and (D) of FIGS. 6 and 7, it is possible to obtain a focus error signal FE and a pull-in signal PI corresponding to each of the positions as data of reflection from the disc.

When the objective lens 2 is in the vicinity of a just focus point as shown in FIG. 6(C) and FIG. 7(C), a reflected beam is detected as a proper level, and consequently, an S-shaped curve is observed as the focus error signal and an amplitude level is increased as the pull-in signal PI. When focused on the disc surface 105, 128 as shown in FIG. 6(B) and FIG. 7(B), the reflectivity is low but some reflection is detected. Consequently, a small S-shaped curve is observed as the focus error signal, an a small amplitude level is observed as the pull-in signal PI.

As the first example of a disc identification operation, the objective lens 2 is forcibly moved like a focus search operation and, for example, the pull-in signal PI is used to detect an amplitude obtained from the disk signal plane and an amplitude obtained from the disc surface. The time duration of each of the amplitudes is determined to identify a CD 100 or a DVD 120. That is, in the case of a 1.2 mm single-plate disc, the distance between the disc surface 105 to the signal plane 102 is approximately 1.2 mm, whereas in the case of a double-plate disc, the distance from the disc surface 128 to the signal plane 122 is approximately 0.6 mm. Consequently, a time difference between a timing when an amplitude is obtained from a just focus on the disc surface generating an amplitude and a timing when an amplitude is obtained from a just focus on the signal plane varies depending on the disc type, i.e., a 1.2 mm single-plate disc or a 0.6 mm double-plate disc. This can be utilized to identify a disc from, for example, the pull-in signal PI.

It should be noted that such an identification can also be carried out by using the focus error signal, which will be explained later as a third example of identification operation.

The first example of disc identification operation using the pull-in signal will be detailed with reference to FIG. 8.

The operation to forcibly move the objective lens 2 in the focus stroke range is identical to the focus search operation.

Consequently, the system controller 30 of the disc drive apparatus controls the servo processor 31 to drive the objective lens 2 in the same way as focus search. In response to this, the servo processor 31 supplies the two-axis driver (18a, 18b) with a signal shown in FIG. 8(A).

In this example, during a disc identification, the switches 22, 23, and 24 are set to the $T_{DV}$ terminal and the disc identification operation is carried out by using the DVD pickup 1b for the reason which will be explained later. For this, with a focus search drive signal as shown in FIG. 8(A), the two-axis driver 18b drives the two-axis driver 3b to forcibly lift/lower the DVD objective lens 2b.

In FIG. 8, "objective lowering" means that the objective lens 2b for DVD is moved apart from the disc and "objective lifting" means that the objective lens 2b for DVD is moved toward the disc. The disc can be identified either during an objective lifting or an objective lowering. However, explanation will be given below for the case that a disc identification is carried out during an objective lifting.

When the objective lens 2 is moved within its focus search range, an amplitude is observed as the pull-in signal PI at a timing when the objective lens 2 is at the just focus position of the disc surface shown in FIG. 6(B) and FIG. 7(B) and at a timing of the just focus position of the signal plane shown in FIG. 6(C) and FIG. 7(C). Because the amplitude level at the just focus on the disc surface is considerably small, it is preferable to firstly amplify the pull-in signal PI. This amplification is carried out in the amplifier circuit 28 of the identification signal generating circuit 27 in FIG. 4.

The pull-in signal PI which has been amplified, for example, looks like FIGS. 8(B) and (D).

In a case when the disc mounted is the 1.2 mm single-plate disc having the disc surface 105 at approximately 1.2 mm from the signal plane 102, lifting of the objective lens 2b by the focus search drive signal of FIG. 8(A) causes a small amplitude at a timing of focusing on the disc surface 105 and then a large amplitude at a timing of focusing on the signal plane 102 as shown in FIG. 8(B). Such a pull-in signal PI is compared to a threshold value TH1 in the comparator circuit 29 to generate an identification signal DD as shown in FIG. 8(C), which is supplied to the system controller 30. The system controller counts a time interval between a pulse of the identification signal DD obtained at timing corresponding to the disk surface 105 and a pulse of the identification signal DD obtained at a timing corresponding to the signal plane 102. This time interval is assumed to be t1.

In a case when the mounted disc is the 0.6 mm double-plate disc having the disc surface 128 at approximately 0.6 mm from the signal plane 122, lifting of the objective lens 2b by the focus search drive signal of FIG. 8(A) also causes a small amplitude at a timing of focusing on the disc surface 128 and then a large amplitude at a timing of focusing on the signal plane 122 as shown in FIG. 8(D). Such a pull-in signal PI is compared to a threshold value TH1 in the comparator circuit 29 to generate an identification signal DD as shown in FIG. 8(E), which is supplied to the system controller 30. The system controller 30 counts a time interval between a pulse of the identification signal DD obtained at the timing corresponding to the disc surface 128 and a pulse of the identification signal DD obtained at the timing corresponding to the signal plane 122. This time interval is assumed to be t2.

That is, depending on the type of disc mounted, i.e., 1.2 mm single-plate disc or 0.6 mm double-plate disc, a value tx obtained is different from t1 or t2 because of the difference in distance from the disc surface and the signal plane. If the system controller 30 has a reference value tTH, for example, as a value between the time counts t1 and t2, and the time count tx is compared to the reference value tTH, then it is possible to determine whether the time count tx is the t1 or t2 in FIG. 8. Thus, the mounted disc can be identified as the CD 100 or the DVD 120.

It should be noted that this type of identification operation is also possible during a lens lowering. The time difference between the two pulses is t3 in the case of a CD 100 as shown in FIG. 8(C) and t4 in the case of a DVD as shown in FIG. 8(E). However, the lens lowering is carried out at a higher speed than the lens lifting according to the focus search drive signal in the example of FIG. 8(A). Consequently, the time intervals t3 and t4 are shorter than the time intervals t1 and t2. Therefore, in the case of FIG. 8, it is more advantageous to accurately identify a disc during a lens lifting than a lens lowering, although identification accuracy also depends on a clock frequency of the time count processing. However, such an advantage cannot be expected if the lens lifting speed is identical to the lens lowering speed. Moreover, if the lens lowering speed is slower than the lens lifting, then it is more advantageous to carry out an identification during the lens lowering.

During an identification operation, a laser beam is radiated on a disc to be identified according to reflected beam data. For this, it is preferable to radiate the laser beam to the inner circumference of the disc which is less affected by skew error. However, it is also possible to radiate the laser beam to the outer circumference of the disc.

Description will now be directed to operation of the system controller 30 when the first example of disc identification as shown in FIG. 8 is employed.

Firstly, it can be said that in the stage when a mounted disc is not yet identified as a 1.2 mm single-plate disc or a 0.6 mm double-plate disc, there is no difference in principle which of the CD pickup 1a and the DVD pickup 1b is to be used at first.

That is, a disc identification according to the method explained in FIG. 8 requires to use one of the pickups, and the identification can be carried out by any one of the pickups.

A case using the DVD pickup 1b will be explained as the first example of disc identification, whereas a case using the CD pickup 1a will be explained as the second example of disc identification. After that, explanation will be given which of the cases is preferable.

Figure 9:
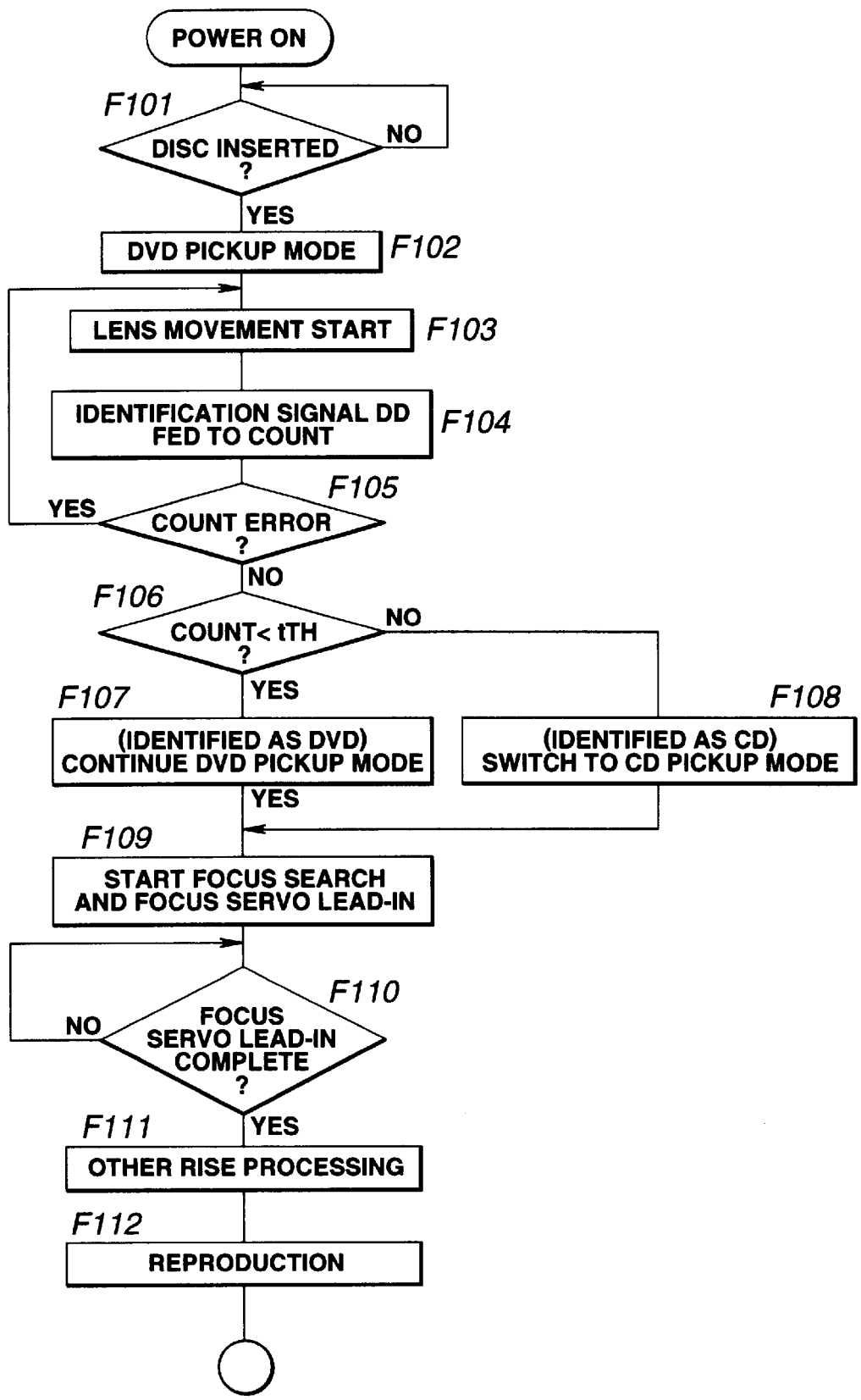
FIG. 9 is a flowchart of the first example of disc identification operation in the embodiment of the present invention.

FIG. 9 is a flowchart showing a processing procedure in the system controller 30, starting at a moment when the power source is turned on and carrying out an identification of a disc D mounted according to the first example of identification before a reproduction mode is set in.

FIG. 9 shows a case of processing when the power source is turned on. When the power source is turned on, the system controller 30 firstly carries out initialization such as setting of various parameters and, as step F101, waits until a disc D is inserted.

When the disc D is inserted, control is passed to step F102, i.e., a DVD pickup mode is set to use the DVD pickup 1b. That is, the switches 22, 23, and 24 are connected to the $T_{DV}$ terminal. Then control is passed to step F103, starting a disc identification processing.

In this case, step F102 has specified the DVD pickup mode and the DVD pickup 1b is used for the disc identification processing.

As has been explained in FIG. 8, in order to carry out an identification, the DVD objective lens 1b is forcibly lifted or lowered within the range of the focus search stroke. In step F103, the lens driving is started. That is, output of a focus search drive signal as shown in FIG. 8(A) is specified. At this time, laser output of the laser diode 4b is also started.

While executing an upward movement (or downward movement) of the DVD objective lens 1b within the focus search stroke range, the system controller 30 enters step F104 to detect an identification signal supplied from the identification signal generating circuit 27, and counts the time interval between two pulses as shown in FIGS. 8(C) and (E).

There is a case when two pulses cannot be correctly observed as the identification signal DD during lifting (or lowering) of the DVD objective lens 1b for a reason such that a level of the reflection on the disc surface is too low. In this case, a count error is caused in step F105 and control is returned to step F103. Drive of the objective lens and the counting processing are executed again. Actually, such a retry operation due to the count error should not be repeated without limit. It is preferable to set a retry count limit.

When the interval between two pulses of the identification signal DD is determined, control is passed to step F106 where the obtained interval is compared to a reference value tTH. If the interval is longer than the reference value, control is passed to step F108 where the disc D is identified as a 1.2 mm single-plate disc, i.e., the CD 100.

Because the DVD pickup 1 has been used for this identification, it is also decided that the mode is not set for the mounted disc D (i.e., CD 100). Therefore, in this step F108, the mode is switched to the CD pickup mode so that the switches 22, 23, and 24 are connected to the $T_{CD}$ terminal and the CD pickup 1a can be used.

On the other hand, in step F106, if the reference value tTH is found to be longer than the obtained time interval, control is passed to step F107 where the disc D is identified as a 0.6 mm double-plate disc, i.e., DVD 120.

When the DVD 120 is identified, the pickup mode need not be changed because the mode is already set to the DVD pickup mode.

When the pickup mode has been set according to the disc identification result, control is passed to a processing for actual reproduction operation. That is, in step F109, the focus search is started for lead-in of the focus servo. When the focus servo lead-in is complete, control is passed from step F110 to F111 for other rise processing. That is, rotation of the spindle motor 6 is set, and processing of the servo system such as the tracking servo ON is completed so that data can be read out from the disc D. Moreover, necessary control data such as TOC recorded on the disc D is read in. When these processings are complete, control is passed to step F112 for reproduction of the CD 100 or DVD 120.

4. Second Example of Disc Identification Operation and Comparison with the First Identification Operation In the aforementioned first example of disc identification, the DVD pickup 1b is used for disc identification. In the second example of a disc identification operation, the CD pickup 1a is used for the disc identification operation.

Figure 10:
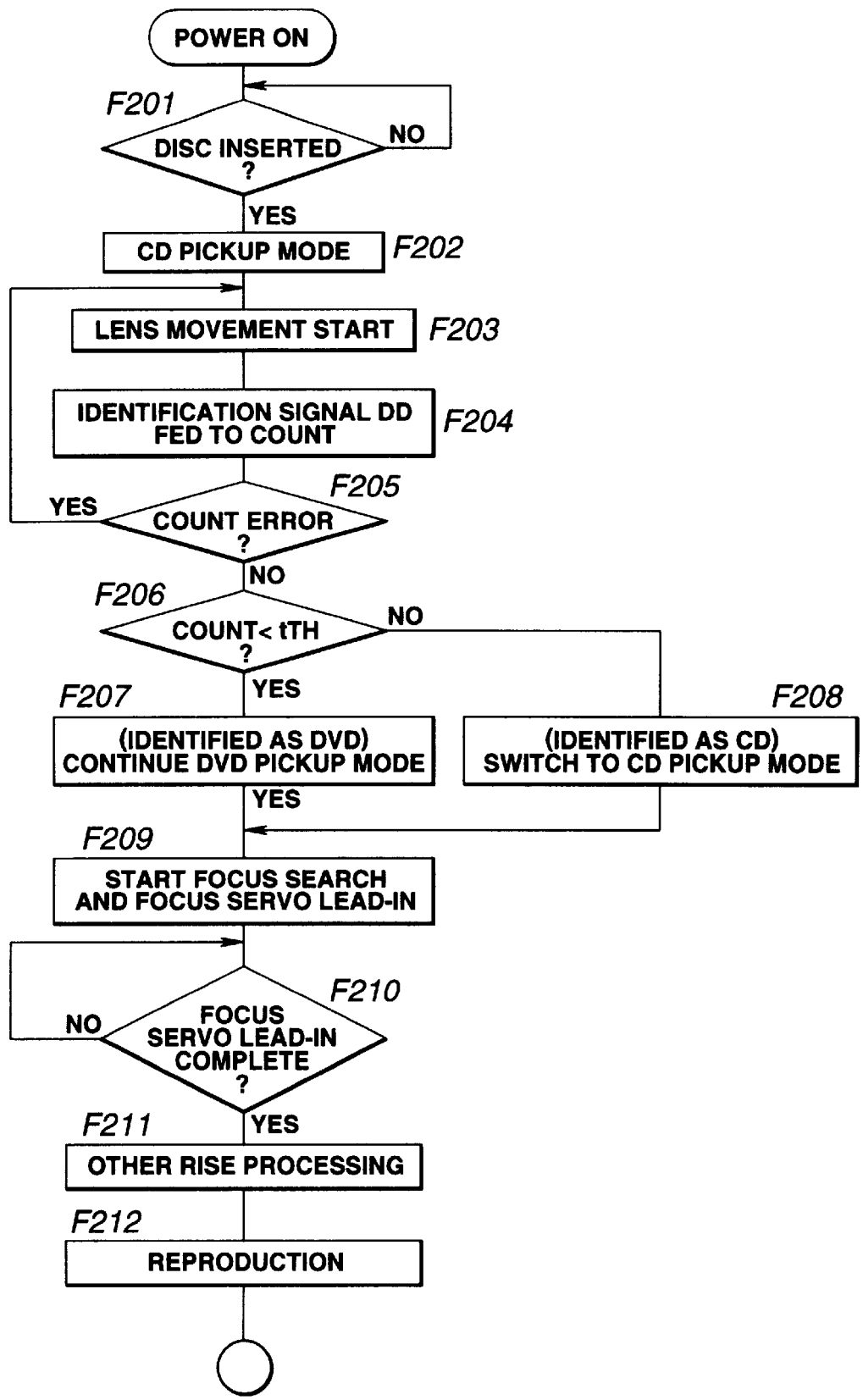
FIG. 10 is a flowchart of the second example of disc identification operation in the embodiment of the present invention.

FIG. 10 is a flowchart showing the processings executed by the system controller 30 when carrying out this second example of disc identification operation.

As shown in FIG. 10, when the power source is turned on, the system controller 30 executes initialization and waits for insertion of a disc D as step F201.

When the disc D is inserted, control is passed to step F202 and the CD pickup mode is set in for using the CD pickup 1a. That is, the mode is set for connecting the switches 22, 23, and 24 to the $T_{CD}$ terminal. Then, an initialization procedure starts in step F203.

For this disc identification processing, the CD pickup 1a is used because the CD pickup mode has been set in step F202.

The identification operation is identical to that of the aforementioned first example. As has been explained in FIG. 8, the objective lens drive is started in step F203 so that the objective lens 1a for CD is forcibly lifted or lowered within a range of the focus search stroke.

While executing upward movement (or downward movement) of the CD objective lens 1a within the range of the focus search stroke range, the system controller 30 enters step F204 to detect an identification signal DD supplied from the identification signal generating circuit 27 and count the interval between two pulses as shown in FIGS. 8(C) and (E). If two pulses cannot be correctly observed as the identification signal DD during a lifting (or lowering) of the CD objective lens 1a, a count error is caused in step F205 and control is returned to step F203, where lens drive and count processing is executed again.

When the time interval between two pulses of the identification signal DD is determined, control is passed to step F206 where the obtained value is compared to a reference value tTH. If the time interval is longer than the reference value, control is passed to step F208 where the disc D is identified as a 1.2 mm single-plate disc, i.e., CD 100.

When the CD 100 is identified, the pickup mode state will not be changed because the mode is already set to the CD pickup mode.

On the other hand, if step F206 determines that the time interval counted is shorter than the reference value tTH, control is passed to F 207 where the disc D is identified as a 0.6 mm double-plate disc, i.e., DVD 120.

Because the CD pickup 1a has been used for this identification, it is also decided that the mode is not set for the disc D mounted (i.e., DVD 120). Therefore, in this step F208, the mode is switched to the DVD pickup mode so that the switches 22, 23, and 24 are connected to the $T_{DV}$, terminal and the DVD pickup 1b can be used.

When the pickup mode has been set according to the disc identification result, control is passed to a processing for actual reproduction operation. That is, in step F209, the focus search is started for lead-in of the focus servo. When the focus servo lead-in is complete, control is passed from step F210 to F211 for other rise processing. That is, rotation of the spindle motor 6 is set, processing of the servo system such as the tracking servo ON is completed so that data can be read out from the disc D. Moreover, necessary control data such as TOC recorded on the disc D is read in. When these processings are complete, control is passed to step F212 for reproduction of the CD 100 or DVD 120.

As has thus far been described, the first example of disc identification operation uses the DVD pickup 1b, whereas the second example of disc identification operation uses the CD pickup 1a.

Disc identification is possible by employing any one of the methods. This will be clearly shown with reference to FIGS. 11 to 14.

Figure 11:
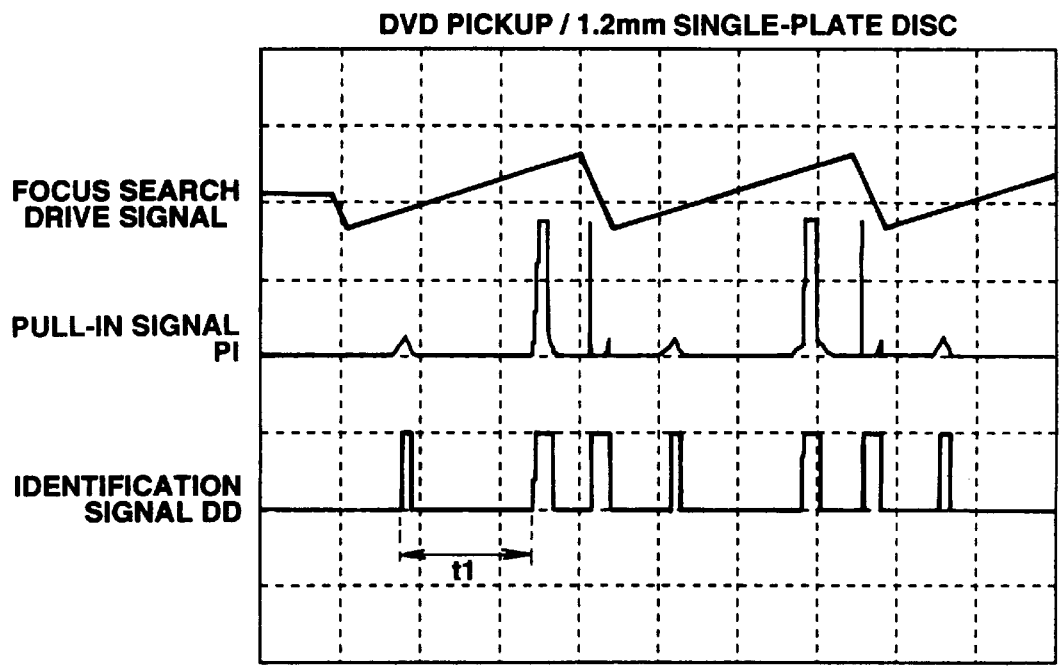
FIG. 11 shows signal waveforms obtained in the first example of disc identification operation in the embodiment of the present invention.
Figure 12:
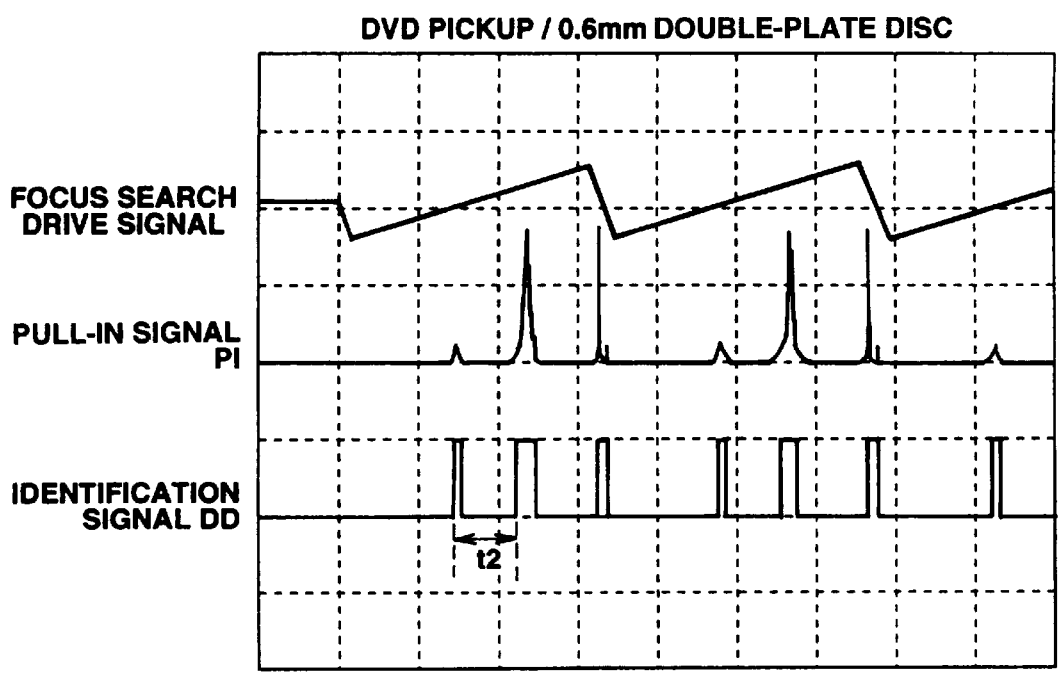
FIG. 12 shows signal waveforms obtained in the first example of disc identification operation in the embodiment of the present invention.

FIGS. 11 and 12 show signal waveforms in an experiment of the first example of disc identification operation using the DVD pickup 1b.

FIG. 11 shows a signal waveform obtained when the CD 100 is mounted, whereas FIG. 12 shows a signal waveform obtained when the DVD 120 is mounted.

In each of the Figures, it is possible to clearly observe the time intervals t1 and t2 shown in FIG. 8, i.e., the time difference between the pulses of the identification signal DD which varies depending on the disc type. This means that there is no problem when the DVD pickup 1b is used.

Figure 13:
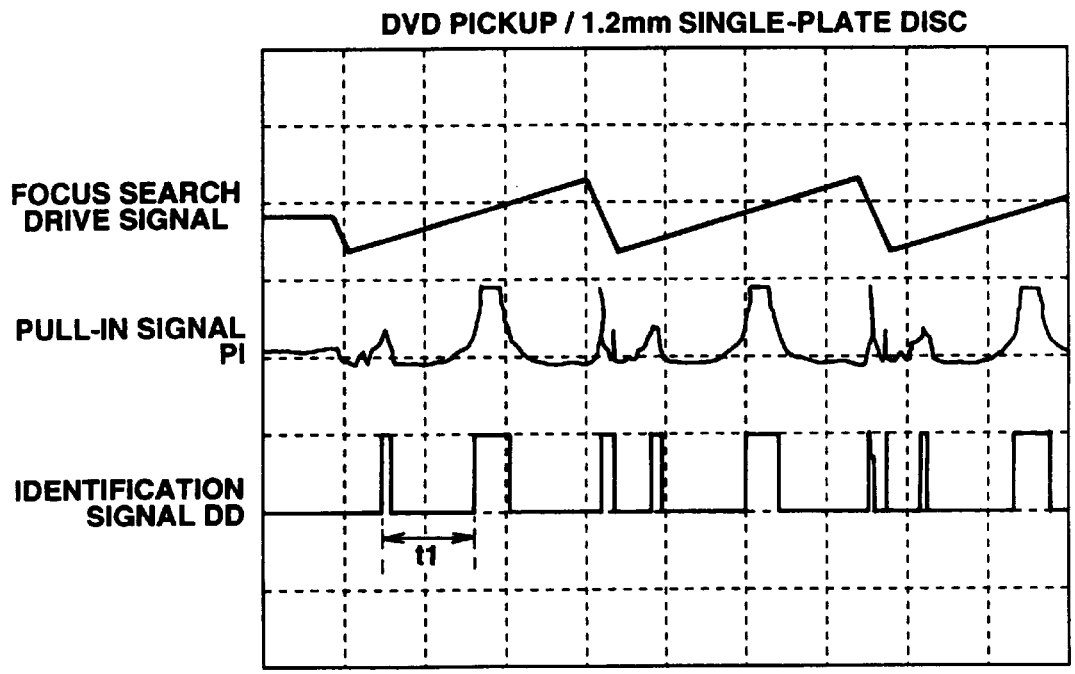
FIG. 13 shows signal waveforms obtained in the second example of disc identification operation in the embodiment of the present invention.
Figure 14:
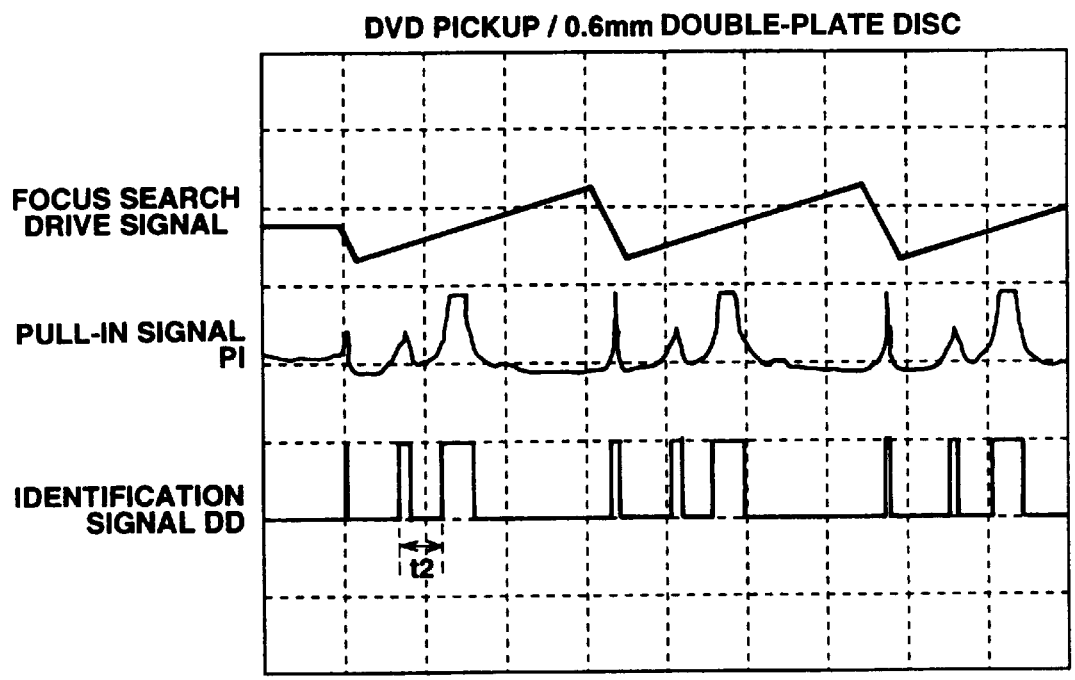
FIG. 14 shows signal waveforms obtained in the second example of disc identification operation in the embodiment of the present invention.

Next, FIGS. 13 and 14 show signal waveforms obtained in an experiment of the second example of disc identification operation using the CD pickup 1a.

FIG. 13 shows a waveform obtained when the CD 100 is mounted, whereas FIG. 14 shows a waveform obtained when the DVD 120 is mounted.

In this case also, it is possible to clearly observe the time difference between pulses of the identification signal which varies depending on the disc type. This means that it is possible to correctly identify a disc by using the CD pickup 1a.

That is, in principle, it is possible to use any one of the pickups for identification. However, there are some advantages and disadvantages because of the design conditions.

Firstly, explanation will be given for the conditions which make the first example of disc identification operation using the DVD pickup 1b more advantageous.

In the disc identification operation according to the principle explained in FIG. 8, it is necessary that a just focus state be obtained on both of the signal plane and the disc surface when the objective lens is moved in the focus stroke range. That is, it is necessary to obtain a pulse as the identification signal DD corresponding to each of the signal planes and the disc surface.

Figures 15A, 15B:
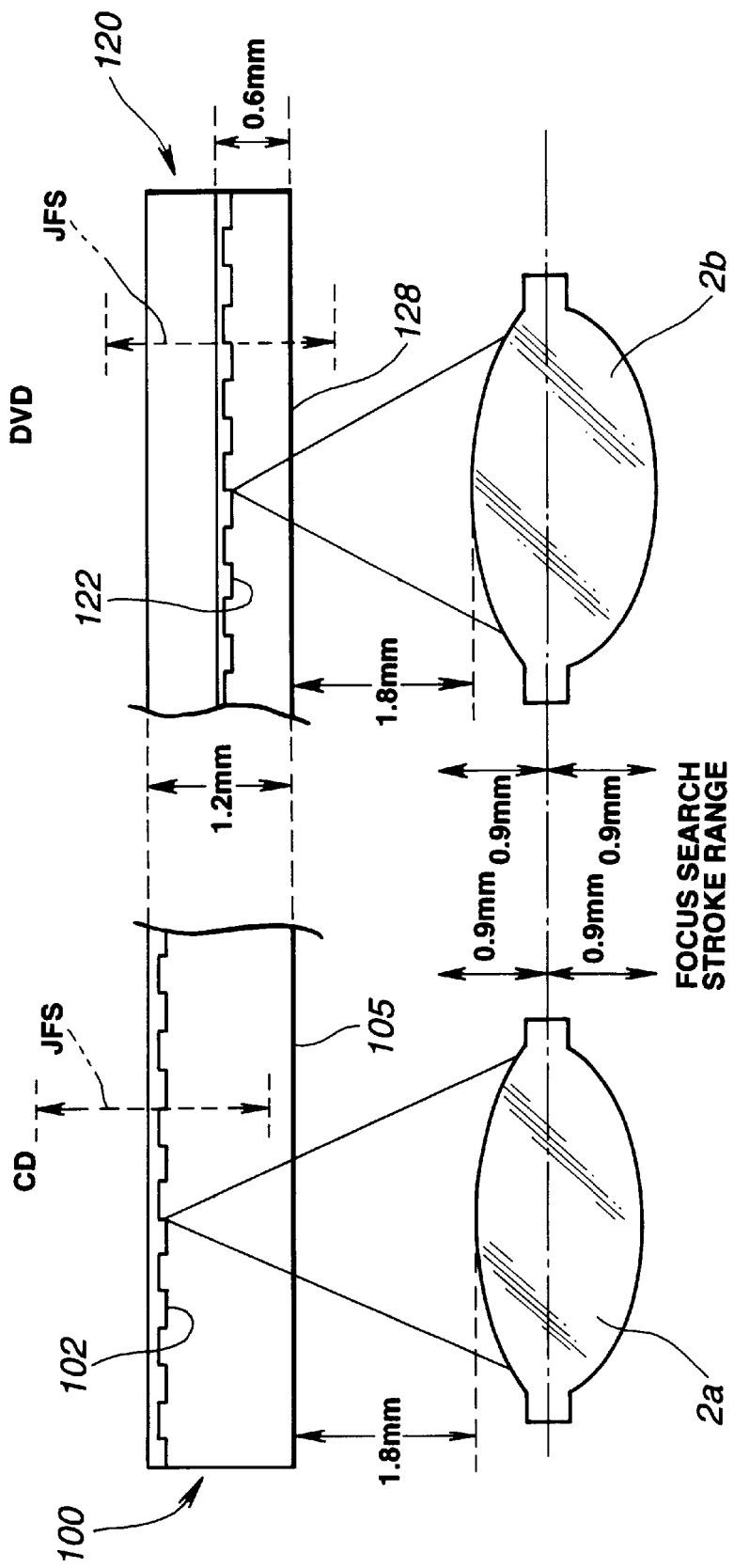
FIGS. 15A and 15B show a comparison between the first and the second examples of disc identification operation.

FIG. 15(A) shows the CD objective lens 2a and the CD 100, whereas FIG. 15(B) shows the DVD objective lens 2b and the DVD 120.

Each of the objective lenses is set in a normal state so that a distance between the upper surface of the lens and the disk surface is approximately 1.8 mm. The focus stroke range is ±0.9 mm from the normal state (that is, the state when no power is applied to a focus coil of the two-axis mechanism).

If it is assumed that the CD objective lens 1a is mounted to obtain a just focus on the signal plane 102 in the normal state, then movement of the CD objective lens 1a in the focus search stroke range corresponds to a range of laser beam focus point shown as JFS in FIG. 15(A), which is 0.9 mm upward and downward from the signal plane 102.

It goes without saying that, this is not always the case, depending on the mounting accuracy and various design conditions. However, if the condition of FIG. 15(A) is taken into consideration, the use of the CD objective lens 2a leaves a possibility that no just focus state can be obtained on the disc surface (105, 128) even if the lens is moved entirely within the focus search stroke range.

On the other hand, if it is assumed that the DVD objective lens 1b is mounted, as shown in FIG. 15(B), to obtain a just focus on the signal plane 128 in the normal state, then, the movement of the DVD objective lens 1b within the focus search stroke range corresponds to a range of laser beam focus point shown as JFS in FIG. 15(B), which is 0.9 mm upward and downward from the signal plane 128. This assures that a just focus can be obtained both on the signal plane 128 and the disc surface (105, 128).

When such a condition is taken into consideration, it is preferable to employ the first example of disc identification operation, which scarcely causes an identification error and improves the operation efficiency.

Subsequently, explanation will be given for the conditions which make the second example of disc identification operation using the CD pickup 1a more advantageous.

The disadvantage explained in FIG. 15 is not decisive, but it is possible to design so that the just focus state of the laser beam can be obtained on both of the signal plane and the disc surface without changing the focus search stroke range.

Especially in the case when the skew servo mechanism is provided, as explained in FIGS. 2 and 4, it is possible to change the relative inclination state so that both of the signal plane and the disc surface are included within the range of the laser beam focus point for disc identification.

It should be noted that it is possible even to identify a disc out of specifications by providing a skew servo mechanism and adjusting it during an identification operation.

If the aforementioned disadvantage can be eliminated by using this kind of means, there is an advantage in using the CD pickup 1a that the CD-R 110 can be preferably identified. That is, as has been explained in FIG. 1, if the dependency of the CD-R 110 on the wave length is taken into consideration, it is preferable to use the CD pickup 1a to detect the pull-in signal for identification of the CD-R 110.

In any case, when carrying out a disc identification according to the method explained in FIG. 8, the pickup to be used can be selected according to the design and function of the disc drive apparatus as well as the object to be identified.

5. Third Example of Disc Identification Operation

The aforementioned first and second examples use the pull-in signal PI to generate the identification signal in the identification signal generating circuit 27, whereas the third example of disc identification operation supplies the focus error signal to the identification signal generating circuit 27 to generate the identification signal DD.

FIG. 16 shows an operation waveform in this example. The focus error signal FE is observed as an S-shaped curve at the just focus position. Consequently, if the objective lens is driven by a focus drive signal as shown in FIG. 16(A), the S-shaped curve of the focus error signal FE can be observed both at the just focus timing on the disc surface and at the just focus timing on the signal plane as shown in FIGS. 16(B) and (D).

Such a focus error signal FE is compared to a threshold value TH1 in the comparator 29 to generate an identification signal DD as shown in FIG. 16(C) or (E).

The system controller 30 carries out an identification operation by using the generated identification signal DD in the same way as the aforementioned first and second examples. That is, if a time difference between two pulses as the identification signal DD corresponds to the value of t11 (during a lens lifting) or t13 (during a lens lowering) of FIG. 16(C), then the disc mounted is identified as the CD 100 or the CD-R 110; and if the time difference between two pulses as the identification signal DD correspond to t12 (during a lens lifting) or t14 (during a lens lowering) of FIG. 16(E), then the disc is identified as the DVD 120.

Thus, disc identification can be carried out correctly by using a focus error signal in the same way as when the pull-in signal PI is used.

6. Fourth Example of Disc Identification Operation

Figure 17:
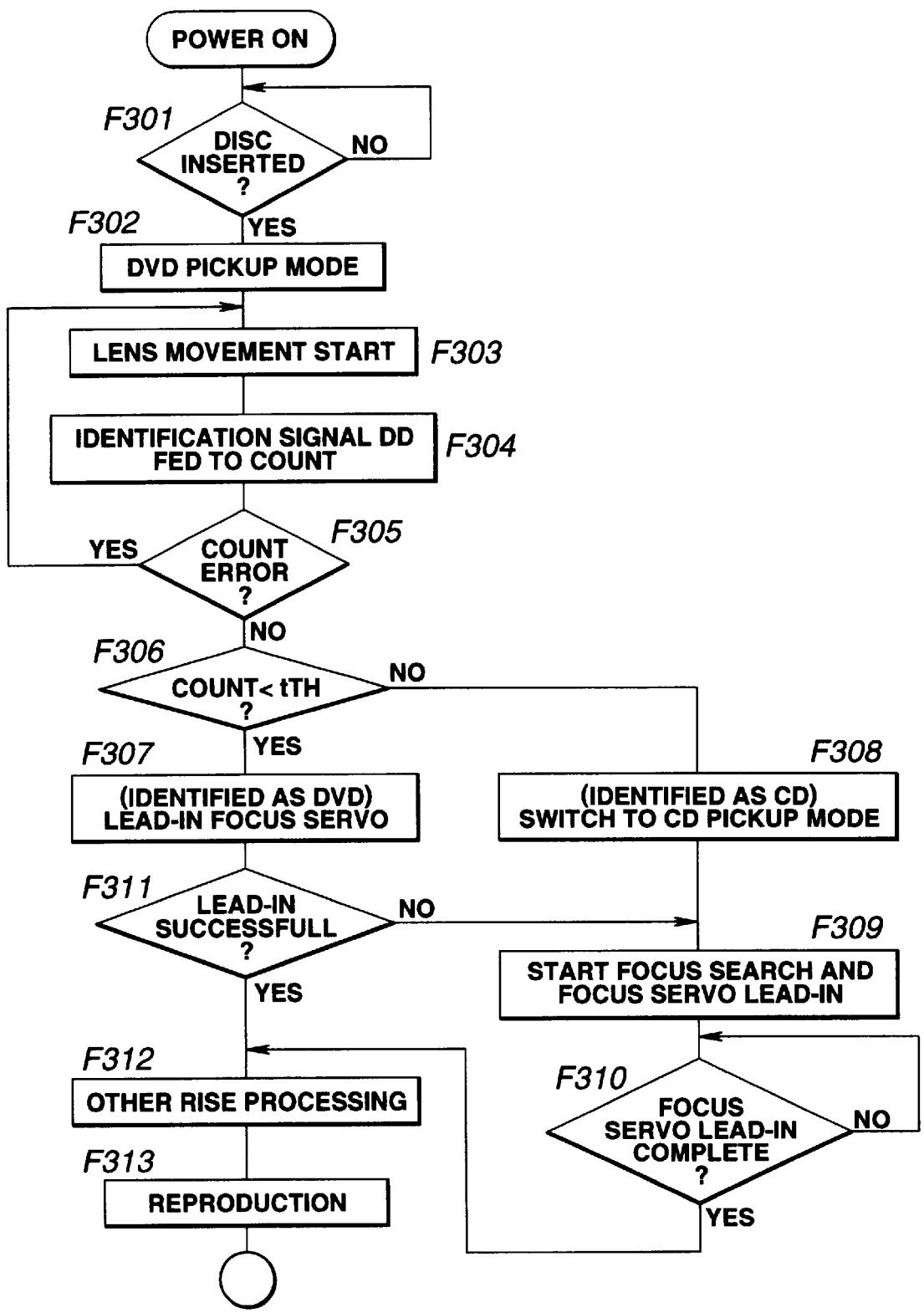
FIG. 17 is a flowchart of the fourth example of disc identification operation in the embodiment of the present invention.

FIG. 17 is a flowchart showing the processing executed by the system controller 30 as the fourth example. It is assumed that the disc identification operation itself is identical to that the aforementioned first example. The fourth example improves the efficiency of the operation carried out after the disc identification operation.

In FIG. 17, processings executed in steps F301 to F306 are identical to the processings carried out in steps F101 to F106, and explanation on these steps will be omitted.

In steps F303 to F306 for the identification operation, the time interval between two pulses as the identification signal DD is counted, and the counted value is compared to the reference value tTH to identify the disc. If the disc is identified as the CD 100, control is passed to step F308. In this case, the DVD pickup 1b has been used for the identification operation, and the pickup mode is switched to the CD pickup mode.

After this, in step F309, a processing for actual reproduction is started. That is, in step F309, focus search is started and lead-in of the focus servo is carried out. When the focus servo lead-in is complete, control is passed from step F310 to F312 to execute necessary rise processings such as setting rotation of the spindle motor 6, executing the processing of the servo system such as tracking servo ON, and reading necessary control data from the disc D including TOC. When these processings are complete, control is passed to step F313 where the reproduction processing of the CD 100 is started.

On the other hand, if the reference value tTH is longer as a result of the comparison in F306, the disc D is identified as an 0.6 mm double-plated disc, i.e., DVD 120. Because the DVD pickup 1b has been used for the disc identification operation, the pickup mode need not be switched to the other. Moreover, in the disc identification operation, an operation equivalent to the focus search as shown in FIG. 8(A) has been carried out, and the just focus timing on the signal plane can be detected as a pulse of the identification signal DD. Consequently, at this moment, the objective lens 2 is at least within the focus lead-in range, i.e., in the linear region of the S-shaped curve.

That is, the timing immediately after the disc identification is executed is also a preferable timing for the focus servo lead-in.

In the case when control is passed from step F306 to F307, the focus servo lead-in is carried out. If the lead-in is successful, control is passed from step F311 directly to step F312, and after this, in step F313, reproduction processing of the DVD 120 is started.

In other words, in this case, the drive operation of the objective lens for the disc identification is carried out simultaneously with the drive operation of the objective lens for the focus search. Thus, the operation efficiency is remarkably improved.

It should be noted that if the lead-in in step F307 fails, control is passed from step F311 to F309 where the normal focus search is carried out.

FIG. 17 explains the case when the DVD pickup 1b is used for the disc identification operation. However, as has been explained in the second example of disc identification operation, the operation shown in FIG. 17 is also applicable to the case when the CD pickup 1a is used for the disc identification operation.

In such a case, the focus servo lead-in is carried out at the moment when the disc mounted is identified as the CD 100, i.e., it is decided that pickup mode switching is not required.

When employing this fourth example of identification operation, the movement of the objective lens in step F303, i.e., the movement of the lens for obtaining the identification signal DD, should be upward movement. That is, the second pulse of the identification signal DD should be obtained corresponding to the signal plane. This is because that if the identification is executed during a lens lowering, the second pulse of the identification signal DD is obtained corresponding to the disc surface and the focus servo lead-in is possibly carried out corresponding to the disc surface.

Thus, four examples of identification operation have been described as embodiments of the present invention. However, the present invention is not limited to these embodiments, but can be modified in various ways.

The disc drive apparatus explained above has a pickup consisting of two independent pickups 1a and 1b as an example. However, it is also possible to provide a single pickup in which only a partial mechanism including at least a laser source and an objective lens is dedicated to a particular disc, and the remaining part is shared by different types of discs.

Moreover, explanation has been given for the disc drive compatible with both the CD 100 and the DVD 120. However, it is also possible to provided a disc drive apparatus dedicated to the CD 100 or the DVD 120. That is, when a disc is mounted on a disc drive apparatus, it is necessary to decide whether the disc is an appropriate one for the apparatus, i.e., a disc identification processing is required. For this, it is possible to employ the disc drive apparatus according to the present invention which carries out the identification processing as has been explained above.

As has thus far been described, in the disc drive apparatus according to the present invention, a disc mounted is identified as a first type of disc or a second type of a disc by using reflected beam data obtained from a laser beam output from pickup means to the disc to be focused on the disc surface and a reflected beam data obtained from a laser beam reflected from the disc signal plane. Thus, without using a dedicated sensor, identification operation can be carried out by using the pickup means. This has an effect to simplify the configuration of the disc drive apparatus. There is no problem for identification of a disc even if it is not contained in a cartridge or if it has an external size identical to that of a different type of disc.

The identification means observes a luminous energy signal of a reflected beam, a focus error signal corresponding to a focusing state of a laser beam, and the like. The focusing position of the laser beam output from the pickup is forcibly changed within a variable range at a predetermined velocity to use a luminous energy signal and a error signal for calculating a time difference between a timing of focusing on the disc surface and a timing on the disc signal plane, and the value obtained is used to identify a first or a second type of disc. Thus, accurate identification operation can be realized by using the pickup means.

Moreover, in a case when the disc drive apparatus is provided with pickup means compatible with both of a first and a second type of disc by selectively switching between a first block corresponding to the first type of disc and a second block corresponding to the second type of disk, control means for controlling switching between the first block and the second block carries out switching according to an identification result of the identification means. Because the identification can identify a disc prior to data read-in (for example, reading of control data such as TOC), one of the first and the second blocks which is necessary can be used even at the rise processing moment. This significantly enhances the operation efficiency.

Furthermore, the control means assumes one of the first block and the second block of the pickup means to be an initially selected block, and uses the initially selected block during an identification operation by the identification means. If the identification means identifies a disc type which corresponds to the initially selected block, the focus servo lead-in is controlled to be carried out following the timing when the laser is focused on the disc signal plane for the disc identification operation. That is, there is a case when the disc identification and the focus servo lead-in are completed almost simultaneously. This further enhances the operation efficiency.

What is claimed is:

1. A disc drive apparatus capable of carrying out recording or reproduction onto/from a first type of disc and a second type of disc, said apparatus comprising:

pickup means for emitting a laser beam;

identification means to identify a mounted disc to be one of said first type and said second type by using first reflected beam data which is obtained when a laser beam from said pickup means is focused on a surface of said disc and second reflected beam data which is obtained when said laser beam is focused on a signal plane of said disc.

2. A disc drive apparatus as claimed in claim 1, wherein each of said first and second reflected beam data is a luminous energy signal of a beam reflected from a disc.

3. A disc drive apparatus as claimed in claim 2, wherein said identification means, while forcibly changing a focus position of the laser beam from said pickup means within a variable range at a predetermined velocity, counts a time difference between a timing of focusing on the disc surface and a timing of focusing on the disc signal plane according to said luminous energy signal; and identifies the disc as the first type or the second type.

4. The disc drive apparatus of claim 3, wherein the direction of said predetermined velocity is from the signal plane to the disc surface.

5. The disc drive apparatus of claim 3, wherein the direction of said predetermined velocity is from the disc surface to the signal plane.

6. A disc drive apparatus as claimed in claim 1, wherein each of said first and second reflected beam data is a focus error signal which corresponds to a state of laser beam focusing.

7. A disc drive apparatus as claimed in claim 6, wherein said identification means, while forcibly changing a focus position of the laser beam from said pickup means within a variable range at a predetermined velocity, counts a time difference between a timing of focusing on the disc surface and a timing of focusing on the disc signal plane according to said focus error signal; and identifies the disc as the first type or the second type.

8. The disc drive apparatus of claim 1, wherein said identification means, while forcibly changing a focus position of the laser beam from said pickup means within a variable range at a predetermined velocity, counts a time difference between a timing of focusing on the disc surface and a timing of focusing on the disc signal plane; and identifies the disc as the first type or the second type.

9. The disc drive of claim 8, wherein the direction of said predetermined velocity is from the signal plane to the disc surface.

10. The disc drive of claim 8, wherein the direction of said predetermined velocity is from the disc surface to the signal plane.

11. A disc drive apparatus as claimed in claim 1, further comprising:
   means for receiving a count error signal when a level of the reflection from the disc surface is below a predetermined level; and
   means for repeating said moving step and said first and second reflected beam data receiving steps.

12. A disc drive apparatus capable of carrying out recording or reproduction onto/from a first type of disc and a second type of disc, said apparatus comprising:
   an optical pickup device for emitting a laser beam;
   identification means to identify a mounted disc to be one of said first type and said second type by using first reflected beam data which is obtained when a laser beam from said optical pickup device is focused on a surface of said disc and second reflected beam data which is obtained when said laser beam is focused on a signal plane of said disc,
   wherein each of said first and second reflected beam data is a luminous energy signal of a beam reflected from a disc.

13. A disc drive apparatus as claimed in claim 12, further comprising control means for switching the optical pickup device between a first mode and a second mode according to a result of identification by said identification means.

14. A disc drive apparatus capable of carrying out recording or reproduction onto/from a first type of disc and a second type of disc, said apparatus comprising:
   pickup means formed in such a manner that a first block corresponding to a first type of disc and a second block corresponding to a second type of disc can be selectively switched to each other to cope with both of the first type of disc and the second type of disc;
   identification means which uses said first block for using a laser beam output from said pickup means onto a mounted disc, i.e., first reflected beam data obtained from beam focusing on a surface of the disc and second reflected beam data obtained from focusing on a signal plane of the disc, to identify the mounted disc as one of the first type of disc and the second type of disc; and
   control means for switching between the first block and the second block of said pickup means according to a result of identification by said identification means.

15. A disc drive apparatus as claimed in claim 14, wherein said control means, assuming one of said first block and said second block to be an initially selected block, uses said initially selected block for identification operation by said identification means and, if the type of disc identified by said identification means corresponds to said initially selected block, carries out focus servo lead-in following a timing when focusing on the disc signal plane is obtained during said identification operation.

16. A disc drive apparatus as claimed in claim 14, wherein each of said first and second reflected beam data is a luminous energy signal of a beam reflected from a disc.

17. A disc drive apparatus as claimed in claim 16, wherein said identification means, while forcibly changing a focus position of the laser beam from said pickup means within a variable range at a predetermined velocity, counts a time difference between a timing of focusing on the disc surface and a timing of focusing on the disc signal plane according to said luminous energy signal; and identifies the disc as the first type or the second type.

18. The disc drive apparatus of claim 17, wherein the direction of said predetermined velocity is from the signal plane to the disc surface.

19. The disc drive apparatus of claim 17, wherein the direction of said predetermined velocity is from the disc surface to the signal plane.

20. A disc drive apparatus as claimed in claim 14, wherein each of said first and second reflected beam data is a focus error signal which corresponds to a state of laser beam focusing.

21. A disc drive apparatus as claimed in claim 20, wherein said identification means, while forcibly changing a focus position of the laser beam from said pickup means within a variable range at a predetermined velocity, counts a time difference between a timing of focusing on the disc surface and a timing of focusing on the disc signal plane according to said focus error signal; and identifies the disc as the first type or the second type.

22. A disc drive apparatus as claimed in claim 14, further comprising:
   means for receiving a count error signal when a level of the reflection from the disc surface is below a predetermined level; and
   means for repeating said moving step and said first and second reflected beam data receiving steps.

23. A disc drive apparatus capable of carrying out recording or reproduction onto/from a first type of disc and a second type of disc, said apparatus comprising:
   an optical pickup device;
   identification means to identify a mounted disc to be one of said first type and said second type by using first reflected beam data which is obtained when a laser beam from said optical pickup device is focused on a surface of said disc and second reflected beam data which is obtained when said laser beam is focused on a signal plane of said disc; and
   control means for selecting one of a first mode and a second mode to be an initially selected mode of said optical pickup device, said initially selected mode then being used for identification operation by said identification means and, if the type of disc identified by said identification means corresponds to said initially selected mode, said control means further for carrying out focus servo lead-in following a timing when focusing on the disc signal plane is obtained during said identification operation.

24. A disc drive apparatus as claimed in claim 23, wherein each of said first and second reflected beam data is a luminous energy signal of a beam reflected from a disc.

25. A disc drive apparatus as claimed in claim 24, wherein said identification means, while forcibly changing a focus position of the laser beam from said optical pickup device within a variable range at a predetermined velocity, counts a time difference between a timing of focusing on the disc surface and a timing of focusing on the disc signal plane according to said luminous energy signal, and identifies the disc as one of the first type and the second type.

26. The disc drive apparatus of claim 25, wherein the direction of said predetermined velocity is from the signal plane to the disc surface.

27. The disc drive apparatus of claim 25, wherein the direction of said predetermined velocity is from the disc surface to the signal plane.

28. The disc drive apparatus of claim 23, wherein said identification means, while forcibly changing a focus position of the laser beam from said pickup means within a variable range at a predetermined velocity, counts a time difference between a timing of focusing on the disc surface and a timing of focusing on the disc signal plane; and identifies the disc as the first type or the second type.

29. The disc drive of claim 28, wherein the direction of said predetermined velocity is from the signal plane to the disc surface.

30. The disc drive of claim 28, wherein the direction of said predetermined velocity is from the disc surface to the signal plane.

31. A disc drive apparatus as claimed in claim 23, wherein each of said first and second reflected beam data is a focus error signal which corresponds to a state of laser beam focusing.

32. A disc drive apparatus as claimed in claim 31, wherein said identification means, while forcibly changing a focus position of the laser beam from said optical pickup device within a variable range at a predetermined velocity, counts a time difference between a timing of focusing on the disc surface and a timing of focusing on the disc signal plane according to said focus error signal, and identifies the disc as one of the first type and the second type.

33. A disc drive apparatus capable of carrying out recording or reproduction onto/from a first type of disc and a second type of disc, said apparatus comprising:

an optical pickup device for emitting a laser beam; and identification means to identify a mounted disc to be one of said first type and said second type by using first reflected beam data which is obtained when a laser beam from said optical pickup device is focused on a surface of said disc and second reflected beam data which is obtained when said laser beam is focused on a signal plane of said disc, wherein said identification means, while forcibly changing a focus position of the laser beam from said optical pickup device within a variable range at a predetermined velocity, counts a time difference between a timing of focusing on the disc surface and a timing of focusing on the disc signal plane and identifies the disc as the first type or the second type, and wherein the direction of said predetermined velocity is from the signal plane to the disc surface.

34. A disc drive apparatus as claimed in claim 33, further comprising control means for selecting one of a first mode and a second mode to be an initially selected mode of said optical pickup device, said initially selected mode then being used for identification operation by said identification means.

35. A disc drive apparatus capable of carrying out recording or reproduction onto/from a first type of disc and a second type of disc, said apparatus comprising:

an optical pickup device formed to be selectively switched between a first mode corresponding to a first type of disc and a second mode corresponding to a second type of disc;

identification means which uses said first mode for using a laser beam output from said optical pickup device onto a mounted disc, i.e., first reflected beam data obtained from beam focusing on a surface of the disc and second reflected beam data obtained from focusing on a signal plane of the disc, to identify the mounted disc as one of the first type of disc and the second type of disc; and control means for switching between the first mode and the second mode of said optical pickup device according to a result of identification by said identification means, wherein said control means uses said initially selected mode for identification operation by said identification means and, if the type of disc identified by said identification means corresponds to said initially selected mode, carries out focus servo lead-in following a timing when focusing on the disc signal plane is obtained during said identification operation.

36. A disc drive apparatus as claimed in claim 35, wherein each of said first and second reflected beam data is a luminous energy signal of a beam reflected from a disc.

37. A disc drive apparatus as claimed in claim 36, wherein said identification means, while forcibly changing a focus position of the laser beam from said optical pickup device within a variable range at a predetermined velocity, counts a time difference between a timing of focusing on the disc surface and a timing of focusing on the disc signal plane according to said luminous energy signal, and identifies the disc as the first type or the second type.

38. The disc drive apparatus of claim 37, wherein the direction of said predetermined velocity is from the signal plane to the disc surface.

39. The disc drive apparatus of claim 37, wherein the direction of said predetermined velocity is from the disc surface to the signal plane.

40. A disc drive apparatus as claimed in claim 35, wherein each of said first and second reflected beam data is a focus error signal which corresponds to a state of laser beam focusing.

41. A disc drive apparatus as claimed in claim 40, wherein said identification means, while forcibly changing a focus position of the laser beam from said optical pickup device within a variable range at a predetermined velocity, counts a time difference between a timing of focusing on the disc surface and a timing of focusing on the disc signal plane according to said focus error signal, and identifies the disc as the first type or the second type.

42. A method of identifying which of a first disc type and a second disc type is a mounted disc in a disc drive apparatus including an optical pickup device and identification means for identifying a mounted disc, said apparatus being capable of carrying out recording or reproduction onto/from said first disc type and said second disc type, said method comprising the steps of:

selecting one of a first mode and a second mode as an initially selected mode of said optical pickup device;

directing a laser beam at said mounted disc;

moving said optical pickup device relative to a disc surface;

receiving first reflected beam data when said laser beam is focused on said surface of said disc;

receiving second reflected beam data when said laser beam is focused on a signal plane of said disc;

identifying which of the first disc type and the second disc type corresponds to the mounted disc based on said first and second reflected beam data; and carrying out focus servo lead-in just following a timing when focusing on the disc signal plane is obtained during said identification operation and when said disc type is identified to correspond with said initially selected mode.

43. The method of claim 42, further comprising the steps of:

receiving a count error signal when a level of the reflection from the disc surface is below a predetermined level; and repeating said moving step and said first and second reflected beam data receiving steps.

44. The method of claim 42, wherein said optical pickup device moves in a direction from said signal plane to said disc surface during said moving step.

45. The method of claim 42, wherein said optical pickup device moves in a direction from said disc surface to said signal plane during said moving step.

46. The method of claim 42, further comprising the steps of:

switching from said initially selected mode to the other of said first and second modes when said disc type is identified to correspond with said other of said first and second modes.

47. The method of claim 46, further comprising the steps of:

receiving a count error signal when a level of the reflection from the disc surface is below a predetermined level; and repeating said moving step and said first and second reflected beam data receiving steps.

48. The method of claim 42, further comprising the steps of:

receiving a count error signal when a level of the reflection from the disc surface is below a predetermined level; and repeating said moving step and said first and second reflected beam data receiving steps.

49. The method of claim 42, further comprising the step of counting a time difference between a timing of receiving said first reflected beam and a timing of receiving said second reflected beam.

* * * * *